United States Patent
Uwatoko et al.

(10) Patent No.: US 7,243,045 B2
(45) Date of Patent: Jul. 10, 2007

(54) FAILURE DIAGNOSIS METHOD, FAILURE DIAGNOSIS APPARATUS, IMAGE FORMING APPARATUS, PROGRAM, AND STORAGE MEDIUM

(75) Inventors: Kouki Uwatoko, Kanagawa (JP); Kouji Adachi, Kanagawa (JP); Kaoru Yasukawa, Kanagawa (JP); Norikazu Yamada, Kanagawa (JP); Eigo Nakagawa, Kanagawa (JP); Tetsuichi Satonaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 95 days.

(21) Appl. No.: 11/064,028

(22) Filed: Feb. 23, 2005

(65) Prior Publication Data

US 2005/0240376 A1  Oct. 27, 2005

(30) Foreign Application Priority Data

Apr. 21, 2004  (JP)  ............................. 2004-125676

(51) Int. Cl.
   G06F 11/00  (2006.01)
(52) U.S. Cl. ........................................ 702/183; 399/9
(58) Field of Classification Search .................. 702/58, 702/59, 69, 81, 83, 93, 130, 179, 181, 183, 702/185, 189, 193; 399/31, 9; 382/112
See application file for complete search history.

(56) References Cited

U.S. PATENT DOCUMENTS 5,053,815 A * 10/1991 Wendell ....................... 399/10
5,610,689 A *  3/1997 Kamiya et al. ............... 399/31
6,535,865 B1   3/2003 Skaaning et al. ............. 706/52
7,076,086 B2 *  7/2006 Miyake et al. ............... 382/112

FOREIGN PATENT DOCUMENTS

JP    A 2001-075808    3/2001

OTHER PUBLICATIONS

U.S. Appl. No. 11/064,126, filed Feb. 23, 2005, Yasukawa et al.

* cited by examiner

Primary Examiner—Carol S. W. Tsai
Assistant Examiner—Mohamed Charioui
(74) Attorney, Agent, or Firm—Oliff & Berridge, PLC

(57) ABSTRACT

A failure diagnosis method diagnoses failure occurring in an image forming apparatus. The failure causes defect in an image output from the image forming apparatus. The failure diagnosis method includes acquiring operation state signals indicating operation states during the image forming apparatus operating in different operation conditions, respectively; and analyzing the acquired operation state signals based on a failure probability model, which is obtained by modeling a cause of the failure occurring in the image forming apparatus with using probabilities, to execute failure diagnosis with respect to each of constituent members constituting the image forming apparatus.

15 Claims, 14 Drawing Sheets

FAILURE DIAGNOSIS METHOD, FAILURE DIAGNOSIS APPARATUS, IMAGE FORMING APPARATUS, PROGRAM, AND STORAGE MEDIUM

BACKGROUND OF THE INVENTION

1. Field of the Invention

The present invention relates to a failure diagnosis method and a failure diagnosis apparatus for diagnosing a failure and malfunction of a drive mechanism section used in an image forming apparatus having a conveyance unit, such as a copying machine, a printer, a facsimile, or a complex machine having these functions, and other devices (for example, electric appliances and automobiles); an image forming apparatus to which the failure diagnosis method and the failure diagnosis apparatus are applied; a program for implementing the failure diagnosis method and the failure diagnosis apparatus by means of an electrical computer; and a storage (recording) medium storing the program.

More specifically, the invention relates to a technique for automatically diagnosing a conveyance device and an image forming apparatus by modeling factors that cause devices/apparatuses to fail into an information processing model based on probabilities such as the Bayesian network model.

2. Description of the Related Art

Recently, in office equipment such as, for example, a copying machine or a printer, high productivity is demanded, so that delays due to failures are not acceptable and it has been demanded that a failure is quickly detected and solved.

Also, in other industrial equipment such as automobiles, airplanes, robots, and semiconductor designing devices, a number of members that are highly reliable and operable at high speed with high accuracy are loaded as means for operation control.

Particularly, frequency of failure in drive members such as motors and solenoids and mechanical members that operate by interlocking with the drive members, including drive circuits for driving the motors, is high in comparison with other electronic parts (passive electronic parts such as resistors and capacitors, transistors, and ICs (integrated circuits)). Particularly, when the use environment is poor, even in a normal method of use, various abnormalities and failures that are hardly detected occur, and a large amount of labor is necessary for solving them.

Therefore, a method of automatic diagnosis with using a system (rule-type system) based on rules has been considered. As an example of the rule-type system, there is available a failure diagnosis system using the Bayesian network (for example, refer to U.S. Pat. No. 6,535,865).

According to U.S. Pat. No. 6,535,865, a system component that may cause the system to fail is modeled by using the Bayesian network, and the Bayesian network has an index node, plural cause nodes, and plural first troubleshooting nodes. The index node has a state indicating whether or not the system component has failed. The plural cause nodes are connected to the index node. Each of the cause nodes indicates a cause of the system component that cause a failure, the plural first troubleshooting nodes that are connected, respectively, to at least one of the plural cause nodes. The first troubleshooting nodes indicate troubleshooting steps for proposing actions for restoring the causes indicated by any of the connected cause nodes. With this configuration, when troubleshooting the system, an action that has a highest probability of solving the problem and requires the lowest cost estimated is proposed for a user.

Herein, in the configuration of U.S. Pat. No. 6,535,865, concretely, a service center has a server for a diagnosis system, and a customer executes diagnosis of his/her printer by using the Bayesian network while connecting to the server and exchanging data via the Internet.

In this example, a customer performs troubleshooting in a way that he/she answers questions from the diagnosis program. However, in order to acquire knowledge information, adopted is a method in which a human directly examines and obtains information by looking at a printer or a printed matter and inputs the information.

Therefore, in this method, if a customer who makes an examination does not get used to this method, there is fear that input information greatly varies, that an accurate diagnosis cannot be executed, and that serious false diagnosis may be caused. Furthermore, since many actions are assigned to a user, the user may feel a great deal of stress. In addition, there is a possibility that eliminating only a cause that is suggested before the action cannot solve the problem.

SUMMARY OF THE INVENTION

The invention was made in view of the above-mentioned circumstances. The invention provides a method for accurately acquiring various information required to diagnose an apparatus without giving stress to a user, when factors that cause a failure are modeled and analyzed with using, for example, the Bayesian network model. The invention provides a mechanism by which problems can be solved without fail.

According to one embodiment of the invention, a failure diagnosis method diagnoses failure occurring in an image forming apparatus. The failure causes defect in an image output from the image forming apparatus. The failure diagnosis method includes acquiring operation state signals indicating operation states during the image forming apparatus operating in different operation conditions, respectively; and analyzing the acquired operation state signals based on a failure probability model, which is obtained by modeling a cause of the failure occurring in the image forming apparatus with using probabilities, to execute failure diagnosis with respect to each of constituent members constituting the image forming apparatus.

According to one embodiment of the invention, a failure diagnosis apparatus diagnoses failure occurring in an image forming apparatus. The failure causes defect in an image output from the image forming apparatus. The failure diagnosis apparatus has a failure diagnosis section. The failure diagnosis section analyzes operation state signals based on a failure probability model, which is obtained by modeling a cause of the failure occurring in the image forming apparatus with using probabilities, to execute failure diagnosis with respect to each of constituent members constituting the image forming apparatus. The operation states signals are automatically acquired in the image forming apparatus during the image forming apparatus operating in different operation conditions, respectively.

According to one embodiment of the invention, an image forming apparatus has the same functional elements as those of the failure diagnosis apparatus described above. A conveyance section provided in the image forming apparatus may have the same functional elements as those of the failure diagnosis apparatus described above.

BRIEF DESCRIPTION OF THE DRAWINGS

A preferred embodiment of the invention will be described in detail based on the following figures, wherein.

DETAILED DESCRIPTION OF THE PREFERRED EMBODIMENTS

Hereinafter, embodiments of the invention are described in detail with reference to the drawings.

CONFIGURATION EXAMPLE OF AN IMAGE FORMING APPARATUS EQUIPPED WITH A FAILURE DIAGNOSIS APPARATUS

Figure 1:
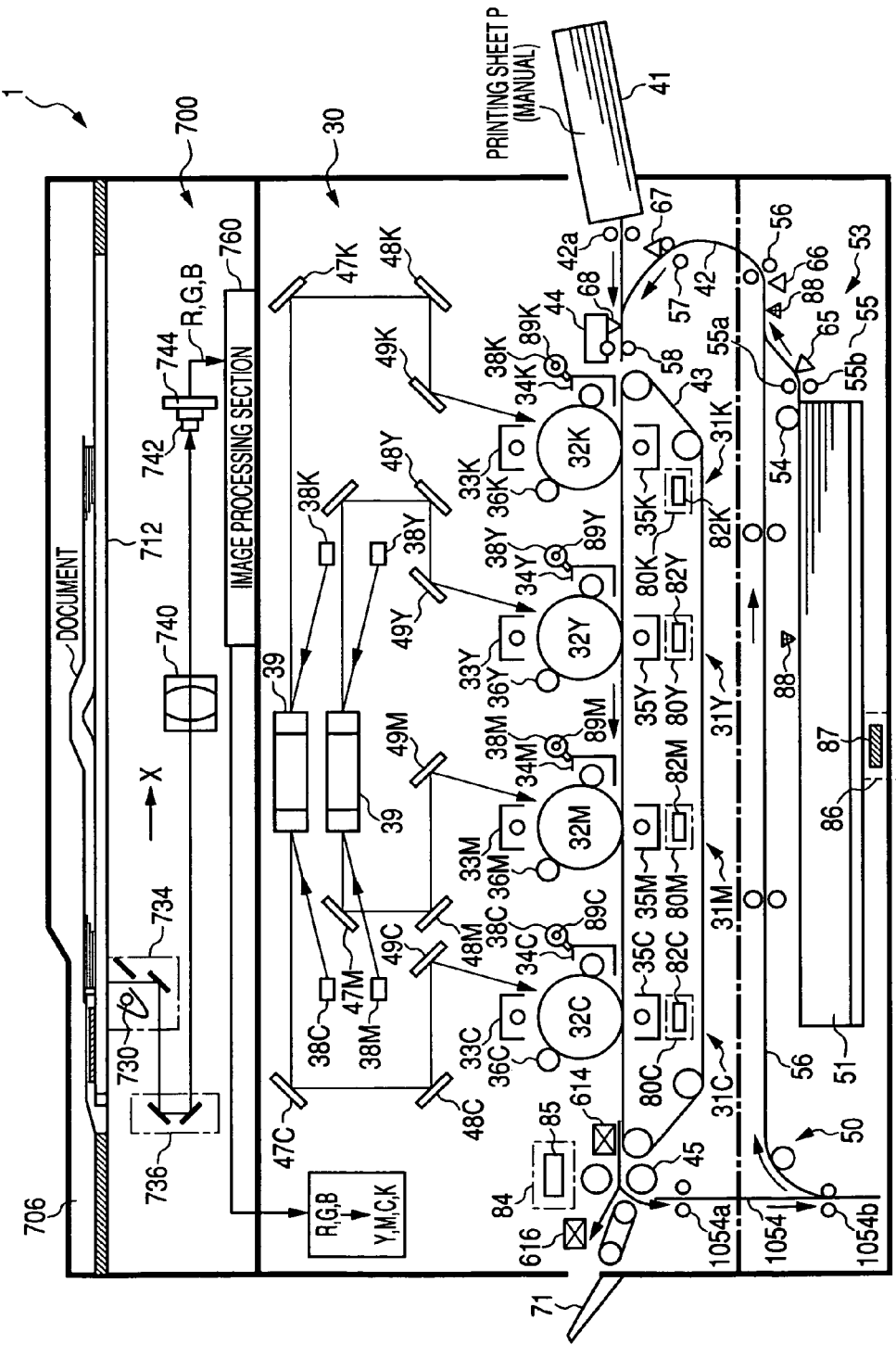
FIG. 1 is a configuration example of an image forming apparatus equipped with a failure diagnosis apparatus according to an embodiment of the invention.

FIG. 1 shows a configuration example of an image forming apparatus equipped with a failure diagnosis apparatus according to an embodiment of the invention. This image forming apparatus 1 has an image reading section (scanner section) for reading an image on, for example, a document. The image forming apparatus 1 is a complex machine having a copying machine function for printing an image corresponding to a document image on the basis of image data read by the image reading section, a printer function for printing-out on the basis of printing data (data showing an image) input from a personal computer, and a facsimile transmission and reception function, which can print out a facsimile image. The image forming apparatus 1 is configured as a digital printing unit.

FIG. 1 is a sectional view of a mechanical part (hardware construction) in this image forming apparatus 1, focusing on an image output section 30 serving as a functional section for transferring an image onto a printing sheet, which is an example of an object to be conveyed and a recording medium, and an image reading section 700 serving as a functional section for reading an image on a document.

<Image Output Section>

The image output section 30 of this embodiment has a so-called tandem configuration including four image forming sections corresponding to the colors of K, Y, M, and C. The image forming section is an example of an image recording device using an optical scanning device (raster output scan: ROS). Hereinafter, reference symbols K, Y, M and C indicating the respective colors are attached to reference numbers of the respective members, and when the members are collectively referred to, these reference symbols will be omitted.

First, this image output section 30 has image forming sections 31K, 31Y, 31M, and 31C of the respective colors of K, Y, M, C, arranged parallel at predetermined intervals in order in one direction, and a transfer belt (conveyance belt) 43.

A pattern detection section 614 is disposed above the transfer belt 43 and on a downstream side of the image forming section 31C in a sheet conveyance direction. The pattern detection section 614 detects resist patterns (test patches for image density and position matching) formed on both sides of the transfer belt 43. In this pattern detection section 614, for example, three resist correction sensors are arranged in line in a direction perpendicular to the conveyance direction of the transfer belt 43.

The transfer belt 43 also has a function as a recording body on which resist patterns are directly printed. When resist patterns are formed on the transfer belt 43, the pattern detection section 614 detects densities of K, Y, M, C images and color shift amounts in main scanning direction and sub-scanning direction. A correction control section (not shown) performs density deviation correction, position deviation correction, and image distortion correction. Accordingly, defective densities and color shifts of the K, Y, M, and C images on a sheet (printing sheet) are prevented. A correction mechanism using these resist patterns has been known to one skilled in the art, so that drawings and detailed description thereof are omitted herein.

The image forming apparatus 1 may adopt the following configuration. That is, the transfer belt 43 may serve as an intermediate transfer belt. The image forming sections 31 of the respective colors transfer images in order on the transfer belt 43 serving as the intermediate transfer belt. Then, a sheet is made to pass between the transfer belt 43 on which the images are transferred and the transfer rollers, thereby transferring the images on the transfer belt 43 onto the sheet.

The image forming section 31 has an optical scanning device including a semiconductor laser 38 and a polygon mirror (rotational polygonal mirror) 39. The polygon mirror reflects a laser beam emitted from the semiconductor laser 38 toward a photoconductive drum roll 32, which is an example of a photoconductive member.

In addition to the polygon mirror 39, various lenses forming optical systems such as a collimator lens and a scanning lens, and a half mirror for making a laser beam emitted from a VCSEL 380a incident on a light amount sensor are disposed on the optical axis of the laser beam although these are not shown.

The image output section 30 has a manual document cassette 41 and a conveyance path 42 for conveying a printing sheet to the image forming sections 31. Furthermore, a front end detection processing section 44 is provided above the conveyance path 42 on which the printing sheet is conveyed from the document cassette 41 to each of the image forming sections 31, in proximity to the conveyance path.

The front end detection processing section 44 has a stopping claw (regulation gate) for temporarily stopping the conveyed printing sheet on the conveyance path 42, and a regulation gate solenoid for operating this stopping claw.

Below the image output section 30, a reversing mechanism section 50 is provided. This reversing mechanism section 50 has a built-in type paper feed tray 51, a sheet reversing mechanism 1054 for double-side copying, and a double-side copying path 56. The paper feed tray 51 may be a plurality of paper feed trays.

In order to convey a sheet from the paper feed tray 51 to the photoconductive drum roll 32 side, for example, a pickup roll (nudger roll) 54, a pair of paper feed rolls 55 consisting of a feed roll 55a and a retard roll 55b, a pair of first conveyance rolls (a pair of take-away rolls) 56, a pair of second conveyance rolls (a pair of pre-regulation rolls) 57, and a pair of third conveyance rolls (a pair of regulation rolls) 58 are provided as roll members on the conveyance path 42, in order from the paper feed tray 51 side to the photoconductive drum roll 32K.

Although not shown, a nudger solenoid for operating this pickup roll 54 is provided near the pickup roll 54. A feed section 53 is formed of the pickup roll 54, the pair of paper feed rolls 55, and the nudger solenoid.

The front end detection processing section 44 obtains a front end detection signal by, for example, optically detecting the front end of a paper sheet to be fed-out onto the transfer belt (conveyance belt) 43, and transmits the front end detection signal to the image processing section 760. The image processing section 760 inputs image formation data of the respective colors of K, Y, M, and C into the image output section 30 in order at predetermined intervals in synch with the input front end detection signal.

The image processing section 760 inputs information indicating which of the front or back side of a printing sheet an image is to be arranged is input into the image output section 30. When receiving information indicating that an image is arranged on a back side of a printing sheet, the image output section 30 transmits a printing sheet to the reversing mechanism section 50 without discharging a printing sheet to the outside of the image forming apparatus 1.

In the image output section 30 and the reversing mechanism section 50 thus configured operate as follows. First, for example, in the image forming section 31K of the black (K) system, a semiconductor laser 38K converts a black image formation signal into an optical signal by being driven in response to the black image formation signal from the image processing section 760, and irradiates the converted laser beam toward the polygon mirror 39. This laser beam scans via reflecting mirrors 47K, 48K, and 49K on the photoconductive drum roll 32K charged by a primary charger 33K, thereby forming an electrostatic latent image on the photoconductive drum roll 32K.

This electrostatic latent image is formed into a toner image by a developing device 34K that supplies black toner.

A transfer charger 35K transfers the toner image onto a printing sheet while the printing sheet on the transfer belt 43 passes through the photoconductive drum roll 32K. Then, after transfer, a cleaner 36K removes excess toner from the photoconductive drum roll 32K.

Likewise, the semiconductor lasers 38Y, 38M, and 38C convert the respective color image formation signals by being driven by image formation signals of the respective colors of Y, M, and C obtained in order at predetermined intervals with respect to the black image formation signal from the image processing section 760, and irradiates the converted laser beams toward the polygon mirror 39.

The laser beams scan via the reflecting mirrors 47Y to 49Y, 47M to 49M, and 47C to 49C on the corresponding photoconductive drum rolls 32Y, 32M, ad 32C charged by the primary chargers 33Y, 33M, and 33C, thereby forming electrostatic latent images on the photoconductive drum rolls 32Y, 32M, and 32C.

The electrostatic latent images are formed into toner images in order by the developing devices 34Y, 34M, and 34C, which supply the respective color toners. Corresponding transfer chargers 35Y, 35M, 35C transfer the toner images onto a printing sheet in order while the printing sheet on the transfer belt 43 passes through the photoconductive drum rolls 32Y, 32M, and 32C.

The printing sheet on which the toner images of the respective colors K, Y, M and C are thus overlap-transferred in order is separated from the transfer belt 43. Fixing rollers 45 fix the toner thereon. Then, the printing sheet is discharged to the outside of the image forming apparatus 1. A discharge path for discharging a printing sheet to the outside of the image forming apparatus 1 is provided on the downstream side of the fixing rollers 45. Also provided at the outside of the image forming apparatus 1 is a discharge tray 71 for receiving printed sheets on which images have been formed by the image output section 30.

Furthermore, a line sensor 616 may be provided between the fixing rollers 45 and the discharge tray 71, as an image reading section for reading an output image to be used in an image diagnosis. The line sensor 616 has a length, which is equal to a width of a printing sheet, and automatically reads the output image during a process of conveying to the discharge tray 71 the printing sheet on which an image has been formed.

When the double-side printing mode is set, a printing sheet on which an image has been fixed on its front surface by the fixing roller 45 as mentioned above is not discharged to the outside of the image forming apparatus 1, but is guided to the sheet reversing mechanism 1054 and turned over, and then fed to the double-side copying path 56. The sheet reversing mechanism 1054 and the double-side copying path 56 are units for double-side copying. When a printing sheet is discharged from the fixing roller 45, the printing sheet falls down through a roller 1054a of the sheet reversing mechanism 1054 by a claw that is not shown. Then, a roller 1054b pushes up and guides the printing sheet to the double-side copying path 56 on the right side. Accordingly, the printing sheet is reversed. Thereafter, the printing sheet is fed to the image forming sections 31 through the conveyance path 42 so that the back side thereof faces the photoconductive drum rolls 32. Toner images for the back side formed on the photoconductive drum rolls 32 are transferred onto the back side of the printing sheet.

The image output section 30 may have the following configuration. That is, electrostatic latent images of the respective colors K, Y, M, and C are subsequently formed onto one photoconductor drum by one laser optical scanner.

The developing devices, which supply toners of the respective colors K, Y, M, and C and are provided around the photoconductor drum, subsequently develop the electrostatic latent images into toner images. The toner images are overlap-transferred onto a printing sheet adsorbed to the transfer drum.

Furthermore, the image forming apparatus 1 has a mechanism for automatically acquiring observation data to be used for judgment of a failure diagnosis. The observation data includes, for example, drive currents, vibrations, operating sounds, specific part temperatures, and sheet passing timings when components (motors, solenoids, and clutches) in the image forming apparatus 1 are operated singly. In a failure diagnosis, the acquired observation data and normal data measured in advance in normal conditions are compared with each other. For example, failure judgment or prediction of future failure occurrence is executed based on distributions of such data.

For example, provided on the conveyance path 42 are first to fourth sensors 65, 66, 67, 68 as sensor members for acquiring sheet passing time information in the image forming apparatus 1. The first sensor (feed-out sensor) 65 is provided between the pair of paper feed rolls 55 and the pair of first conveyance rolls 56 near the pair of paper feed rolls 55. The second sensor (feed-out sensor) 66 is provided between the pair of paper feed rolls 55 and the pair of first conveyance rolls 56 near the pair of first conveyance rolls 56. The third sensor (pre-regulation sensor) 67 is provided between the pair of second conveyance rolls 57 and the pair of third conveyance rolls 58 near the pair of second conveyance rolls 57. The fourth sensor (regulation gate sensor) 68 is provided between the pair of second conveyance rolls 57 and the pair of third conveyance rolls 58 near the stopping claw.

Although not shown, a fixing sensor and a discharge sensor, which serve as sensor members for acquiring the sheet passing time information in the image forming apparatus 1, are disposed on the conveyance path of the fixing roller 45 side, that is, the paper ejecting side.

The pair of paper feed rolls 55 performs a role of handling sheets to prevent overlap-feeding (feeding of two or more sheets) as well as a role of guiding sheets to the first sensor 65, the second sensor 66, and the pair of first conveyance rolls 56. The pair of first conveyance rolls 56 and the pair of second conveyance rolls 57 perform the role of guiding sheets to the photoconductive drum rolls 32.

The regulation gate solenoid provided in the front end detection processing section 44 is used for temporarily stopping a printing sheet by the stopping claw after a predetermined period of time has elapsed since the second sensor 66 is turned on. The purpose of this operation is to take timings for matching the writing start position within the sheet and the positions of the images on the photoconductive drum rolls 32.

The sensors 65, 66, 67, and 68 as sensor members for acquiring the sheet passing time information (hereinafter, collectively referred to as sheet timing sensors 69, also) are sheet detection members (sheet timing sensors) forming a sheet passing time detection section for acquiring sheet conveyance time information. Each of the sheet timing sensors 69 is provided for detecting whether or not a printing sheet, which is an example of an object to be conveyed, is conveyed at a predetermined timing. Detection signals obtained by the sheet timing sensors 69 are input into a measurement section (not shown) for measuring conveyance timing and conveyance time (sheet passing time) of the printing sheet.

For each sheet timing sensor 69 forming a sheet detection member may be various sensors having various forms and characteristics in accordance with the installation site. Basically, a sensor having a pair of a light emitting element (for example, an emission diode) and a light receiving element (for example, a photodiode or a phototransistor) may be used. Alternatively, a photointerrupter formed by integrating a light emitting element and a light receiving element may be used.

The sheet timing sensors 69 may be either a transmission type (called blocking type, also) or a reflection type. In the transmission type sensor, a light emitting element and a light receiving element are disposed to face each other. When no printing sheet is conveyed therebetween, the light receiving element is turned on upon receiving light from the light emitting element. On the other hand, in the state where a printing sheet passes therebetween, the printing sheet blocks the light from the light emitting element and thus, the light receiving element is turned off.

On the other hand, a reflection type sensor is disposed so that the light from the light emitting element is reflected by the printing sheet and that the reflected light enters the light receiving element. In the condition where no printing sheet is conveyed, the light receiving element is turned off without receiving light from the light emitting element. On the other hand, in a state where a printing sheet passes, light from the light emitting element is reflected by the printing sheet and enters the light receiving element. Thereby, the light receiving element is turned on. In the configuration of this embodiment shown in FIG. 1, a reflection type photointerrupter is used for all the sheet timing sensors 69.

A failure diagnosis section (not shown, described later in detail) provided in the image forming apparatus 1 determines failure probabilities of parts on the basis of the acquired passing time information. Then, the failure diagnosis section determines failure probabilities of parts and executes failure diagnosis on the basis of the passing time information acquired by using these sheet timing sensors 69. For example, there are observable nodes (nodes of passing time and standard deviation) observable as resultant nodes of states of the pickup roll (nudger roll) 54 and the pair of paper feed rolls (feed rolls) 55. With regard to the failure probabilities, average times at which a sheet passes through sensors and standard deviations thereof are observed, and when the values are larger than a reference value, it is concluded that failure probability is high.

Furthermore, with regard to the passing timings of the printing sheet, when time from the conveyance start of the printing sheet to a time point at which a printing sheet passes through each sensor deviate from a predetermined time range, the image forming apparatus 1 concludes that normal printing is impossible and then stops the paper conveyance at a position at that instance. This is normally called jamming (JAM).

Furthermore, the image forming apparatus 1 has a drive mechanism vibration detection section 80 for detecting vibrations of the respective drive mechanism section inside the image forming apparatus 1. The drive mechanism vibration detection section 80 has vibration sensors 82 for detecting vibrations in the image forming apparatus for each block. An acceleration sensor that detects acceleration or an acoustic sensor that detects sound generated from machine may be used as the vibration sensors 82. In this embodiment, the vibration sensors 82 are fixed to a main body chassis (not shown), immediately under the photoconductive drum rolls 32. Positions of attaching the vibration sensors 82 are not limited to the positions immediately under the photoconductive drum rolls 32 and may be any positions as long as the vibration sensors 82 can detect all the accelerations and operating sounds of the drive mechanism section of the blocks in the image forming apparatus 1.

Furthermore, the image forming apparatus 1 has a functional element for acquiring environment information relating to the image forming apparatus 1. For example, the image forming apparatus 1 has a working temperature detection section 84 for detecting temperature in the image forming apparatus 1. In this embodiment, the working temperature detection section 84 has a temperature sensor 85, and detects temperature at a desired position inside the image forming apparatus 1 by using the temperature sensor 85.

It is preferable that an electronic sensor having, for example, a platinum resistance thermometer bulb, thermistor, or thermocouple is used as the temperature sensor 85. Alternatively, a non-contact type such as thermopile, which measures infrared rays radiated from an object and measures temperature of the object from an amount of the infrared rays, may be used.

A temperature rise occurs in a case where the temperature inside the image forming apparatus 1 is abnormally high due to heating caused by a failure and in a case where the temperature inside the image forming apparatus 1 rises due to high ambient temperature around a location where the image forming apparatus 1 is placed. The former case is set so that the failure probabilities of related individual parts have great dependent relation, for example, the temperature control concerning the pair of fixing rolls 74 fails or the circuits fail and abnormally heat.

With regard to the fixing rollers 45, since its operation temperature greatly influences image quality, an exclusive temperature sensor (not shown) is provided in order to monitor the operation temperature at a part level. Herein, the fixing roller 45 is illustrated as a member for the operation temperature of which needs to be monitored at a part level. Operation temperatures of other members may be monitored at a part level, not at an environmental level, by providing exclusive temperature sensors as with the fixing roller 45. Particularly, it is preferable that parts that influence the image quality are monitored at a part level.

On the other hand, in the latter case, if the image forming apparatus 1 is placed under such circumstances for a long period of time even in use within the specifications of the image forming apparatus 1, deterioration of rolls accelerates and the coefficient of friction between the rolls and sheet changes, resulting in a temporal change during sheet conveyance. In this case, failure probabilities of related parts are also set to increase.

The image forming apparatus 1 has a working humidity detection section 86 for detecting humidity inside the image forming apparatus 1. The working humidity detection section 86 is an example of the functional element for acquiring the environment information concerning the operations of the drive mechanism section 90 of the image forming apparatus 1. In this embodiment, the working humidity detection section 86 has a humidity sensor 87, and detects humidity at a desired position inside the image forming apparatus 1 by using this humidity sensor 87. For example, the humidity sensor 87 is disposed so as to detect humidity near a sheet and the paper feed tray 51. This is because a sheet is greatly influenced by humidity.

Various sensors are available as the humidity sensor 87, for example, an electronic sensor mainly using changes in electrical properties due to humidity adsorption and desorption of the ambient moisture. For example, a dry and wet bulb humidity sensor, hair humidity sensor, crystal oscillation humidity sensor, and a humidity sensor using a macromolecule sensor, and a metal oxide sensor may be adopted. Particularly, the macromolecule type and the metal oxide type are small-sized sensors compatible with circuits, and are preferably applied to this embodiment.

It has been known that the humidity influences the coefficient of friction between a roll and a sheet and between sheets. As humidity becomes higher, the coefficient of friction between sheets gets increasing and it becomes more difficult to convey a sheet, and probability of misfeeding (conveyance disturbance) becomes higher, resulting in jamming at the feed section. Even during conveyance, the coefficient of friction between a sheet and rolls varies, so that the sheet conveying time changes and the jamming probability is also high.

Furthermore, the image forming apparatus 1 has a consumable detection section serving as a functional element for detecting a state of consumables used in the image forming apparatus 1. In this embodiment, as an example of the consumable detection section, first, a sheet information acquisition section 88 is provided at a predetermined position near the paper feed tray 51 or on the conveyance path 42. The sheet information acquisition section 88 has a reflected light detecting optical sensor or a transmitted light detecting optical sensor, to detect sheet information such as thickness of a printing sheet (expressed by basis weight) and a sheet type by using each detecting optical sensor.

When a sheet is thicker (or thinner) than a regulated value (for example, 50 to 100 $g/m^2$) or is a coated sheet, the sheet is more likely to cause the jamming, so that the sheet information is detected and used for calculation of the failure probabilities.

Furthermore, as another example of the consumable detection section, a color-material remaining-amount detection section 89 for detecting a remaining amount of toner (coloring material) is provided on the color material cartridge disposed near the developing device 34. A mechanism for monitoring the coloring material remaining amount has been known to a person skilled in the art, so that illustration and detailed description thereof are omitted herein.

Furthermore, in order to monitor states of an engine section centered on the photoconductive drum rolls 32 as the observation data used for judgment of a failure diagnosis, a mechanism for monitoring an applied voltage supplied to the primary charger 33 is provided. This monitoring mechanism has been known to one skilled in the art, so that illustration and detailed description thereof are omitted herein.

<Outline of Operation of Image Output Section>

In the image forming apparatus 1 configured as described above, when an image is to be formed on a printing sheet, which is an example of an object to be conveyed, by operating the image output section, the printing sheet is fed out from the paper feed tray 51 and is conveyed to a predetermined position of the image output section 30 and then, an image is formed on the printing sheet.

For example, first, with start of printing, the nudger solenoid operates to push the pickup roll 54 down. Almost simultaneously, motors for rotating the rolls (pairs) inside the image forming apparatus 1 start rotating. The pickup roll 54 pushed down by the nudger solenoid comes into contact with the top printing sheet on the paper feed tray 51 and guides one printing sheet to the pair of paper feed rolls 55.

The regulation gate solenoid stops the printing sheet by the stopping claw after a predetermined time has elapsed since the second sensor 66 is turned on. Thereafter, at a predetermined timing when the writing start position in the printing sheet matches the position of the images on the photoconductive drum rolls 32, the regulation gate solenoid releases the stopping claw. Thereby, the stopping claw returns, and the pair of third conveyance rolls 58 forwards the printing sheet between the photoconductive drum roll 32 and the transfer roll 35.

In the image output section 30, first, the semiconductor laser 38 serving as a light source for forming electrostatic latent images converts image data into an optical signal when the semiconductor laser 38 is driven in response to image formation data supplied from a host computer (not shown). The semiconductor laser 38 irradiates this converted laser beam L toward the polygon mirror 39. This laser beam L scans the photoconductive drum roll 32 charged by the primary charger 33 via optical systems such as the reflecting mirror 48, etc., thereby forming an electrostatic latent image on the photoconductive drum roll 32.

The developing device 34 that supplies toner of a predetermined color (e.g. black) forms (develops) this electrostatic latent image into a toner image. The transfer roll 35 transfers the toner image onto a printing sheet while the printing sheet that has passed through the conveyance path 42 passes between the photoconductive drum roll 32 and the transfer roll 35.

Then, the cleaner 36 and a lamp (not shown clean off and erase the toner and the latent image remaining on the photoconductive drum roll 32. The developing device 34 has a developing clutch (not shown), and adjusts the developing timing by means of this developing clutch.

The fixing rollers 45 heat and press the printing sheet on which the toner has been transferred to fix the toner onto the printing sheet. Lastly, the printing sheet is discharged to the outside of the image forming apparatus 1 through the discharge path.

<Configuration and Operation of the Image Reading Section>

The image reading section 700 optically reads an image drawn on a document from the sheet-like document, which is an object to be read, and has a platen cover 706. Furthermore, the image reading section 700 has a platen glass (document placing base) 712 slightly larger than A3 paper, on which the document, which the object to be read, is placed. The image reading section 700 also has an optical system including a light reception section 742 for reading a document and an image processing section 760 of the image reading section side, below the platen glass 712.

Below the platen glass 712 inside a casing, the image reading section 700 has a full-rate carriage (F/R-CRG) 734 including a light source 730, a roughly concave reflection cap, and a reflection mirror. The light source 730 irradiates light toward a surface (back surface) opposite to the document placing surface of the platen glass 712. The reflection cap reflects light emitted from the light source 730 toward the platen glass 712 side. The reflection mirror deflects the light reflected from the platen glass 712 side in a direction roughly parallel to the platen glass 712.

A fluorescent lamp having its longitudinal direction in the main scanning direction (direction orthogonal to the paper surface of the drawing) may be used as the light source 730. Colors of illumination light emitted from the light source 730 are ones adapted to the spectral optical characteristics of line sensors forming the light reception section 742 For example, white light or green light is used.

Furthermore, the image reading section 700 has a half-rate carriage (H/F-CRG) 736, which has two reflection mirrors disposed to form almost a right angle therebetween inside the casing. The half-rate carriage 736 successively deflects reflected light deflected by the full-rate carriage 734 by each 90 degrees. The full-rate carriage 734 and the half-rate carriage 736 are interlocked by a stepping motor (not shown), and are configured to be movable reciprocally in the sub-scanning direction (an arrow X direction in FIG. 1) and an opposite direction thereto.

Furthermore, the image reading section 700 has a lens 740 for condensing the reflected light deflected by the reflection mirrors of the half-rate carriage 736 to a predetermined focal position. The light reception section 742 receives the reflected light that has been converged by the lens 740 and reads an image in the main scanning direction (the depth direction of the paper surface of FIG. 1) roughly orthogonal to the sub-scanning direction, and successively outputs image signals corresponding to density (analog electrical signal).

The image signal output from the light reception section 742 are processed by unillustrated line sensors (described in detail later) and a read signal processing section, and then transmitted to the image processing section 760. The line sensor is disposed on a substrate 744 and has a photoelectric conversion element such as a photodiode, and a CCD (Charge Coupled Device) or a CMOS (Complementary Metal-Oxide Semiconductor). The read signal processing section is also disposed on the substrate 744 and has a drive control section such as a CCD driver for the driving line sensors.

Furthermore, although not shown, the image reading section 700 further has wires and drive pulleys for moving the reading optical system and the light reception section 742 below the platen glass 712 inside the casing. The drive pulley is rotated back and forth by a driving force of a drive motor, and winds the wire therearound as a result of this rotational driving. Thereby, it is possible to move the reading optical system having the full-rate carriage 734 including the light source 730, the half-rate carriage 736, and the lens 740 at a predetermined speed.

In the above-mentioned configuration, the full-rate carriage 734 of the image reading section 700 forming the reading optical system is normally located at a home position below the platen glass 712. Therefore, even without moving the light reception section 742 in the sub-scanning direction before starting reading, size of the document placed on the platen glass 712 in the main scanning direction can be detected by the line sensors of the light reception section 742.

On the other hand, when a fixed reading method in which a document is placed on the platen glass 712 and read is employed, a document is placed on the platen glass 712 serving as a document placing base by user's hand. In a state where the document is placed at an arbitrary position on the platen glass 712, the fixed reading image front position is set as a front end reference and the reading optical system is scanned at a constant speed in the direction of the arrow X to exposed the document and read an image. Thereby, an analog captured image signal containing spectral components of red, green, and blue is obtained.

At this time of reading, the document is entirely irradiated with illumination light from the light source 730. In order for the light reception section 742 to read an entire input image via the reading optical system such as the lens 740, the reading optical system including the full-rate carriage 734 having the light source 730, the half-rate carriage 736, and the lens 740 and the light reception section 742 are relatively moved at a constant speed rightward (sub-scanning direction) from the left side of FIG. 1 as shown by the arrow X. In other words, the image reading device 3 reads an image on a document while moving the optical system at a constant speed.

The light reception section 742 transmits the captured image signal containing the spectral components obtained by capturing a document image by line sensors to the read signal processing section (not shown), which is provided on the substrate 744 as well as the light reception section 742. The read signal processing section applies desired analog signal processing to the captured image signal obtained by reading, and then converts the signal into digital image data containing color components of red (R), green (G), and blue (B), and transmits the digital image data of red, green, blue to the image processing section 760.

<<Image Inspection Device>>

Figure 2:
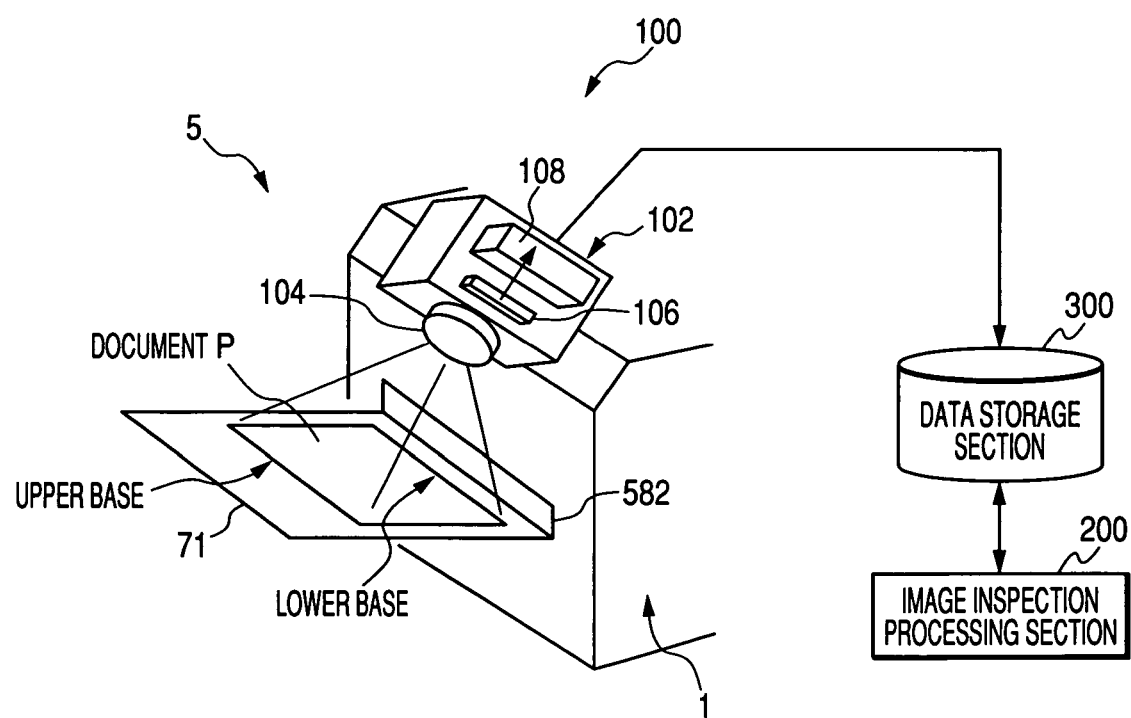
FIG. 2 is a schematic view showing an image inspection device 5 according to an embodiment of the invention.

FIG. 2 is a schematic diagram showing an embodiment of an image inspection device relating to an output image reading method (ND170) and observation data information (ND180) concerning an output image.

As shown in FIG. 2, an image inspection device 5 has an image reading section 100, an image inspection processing section 200, a data storage section 300. The image reading section 100 is an example of an image reading device for reading as a document an output image output from the image forming apparatus 1. The image inspection processing section 200 inspects whether or not the image read by the image reading section 100 includes a defect. The data storage section 300 stores the image read by the image reading section 100, a reference image to be used for inspection executed by the image inspection processing section 200, and intermediate data during the processing.

The discharge tray 71 serves as a document placing base on which an output image to be diagnosed is placed. The discharge tray 71 is colored so that a document P (printed sheet) and the ground (herein, a color of the discharge tray 71) can be distinguished.

The image reading section 100 has a camera head 102, which is an example of an image capturing section for reading an image on the document P. The camera head 102 has an image-capturing lens 104, a CCD image capturing element 106 configured as a line sensor or an area sensor, and a read signal processing part 108. A support member (not shown) supports the camera head 102 so that orientation of the image-capturing lens 104 with respect to the document P discharged onto the discharge tray 71 is adjustable. The camera head 102 is also disposed above discharge opening 582 so as to capture a range including an entirety of the discharge tray 71. The camera head 102 acquires a captured image by capturing the image from an upper and obliquely direction.

Figure 3:
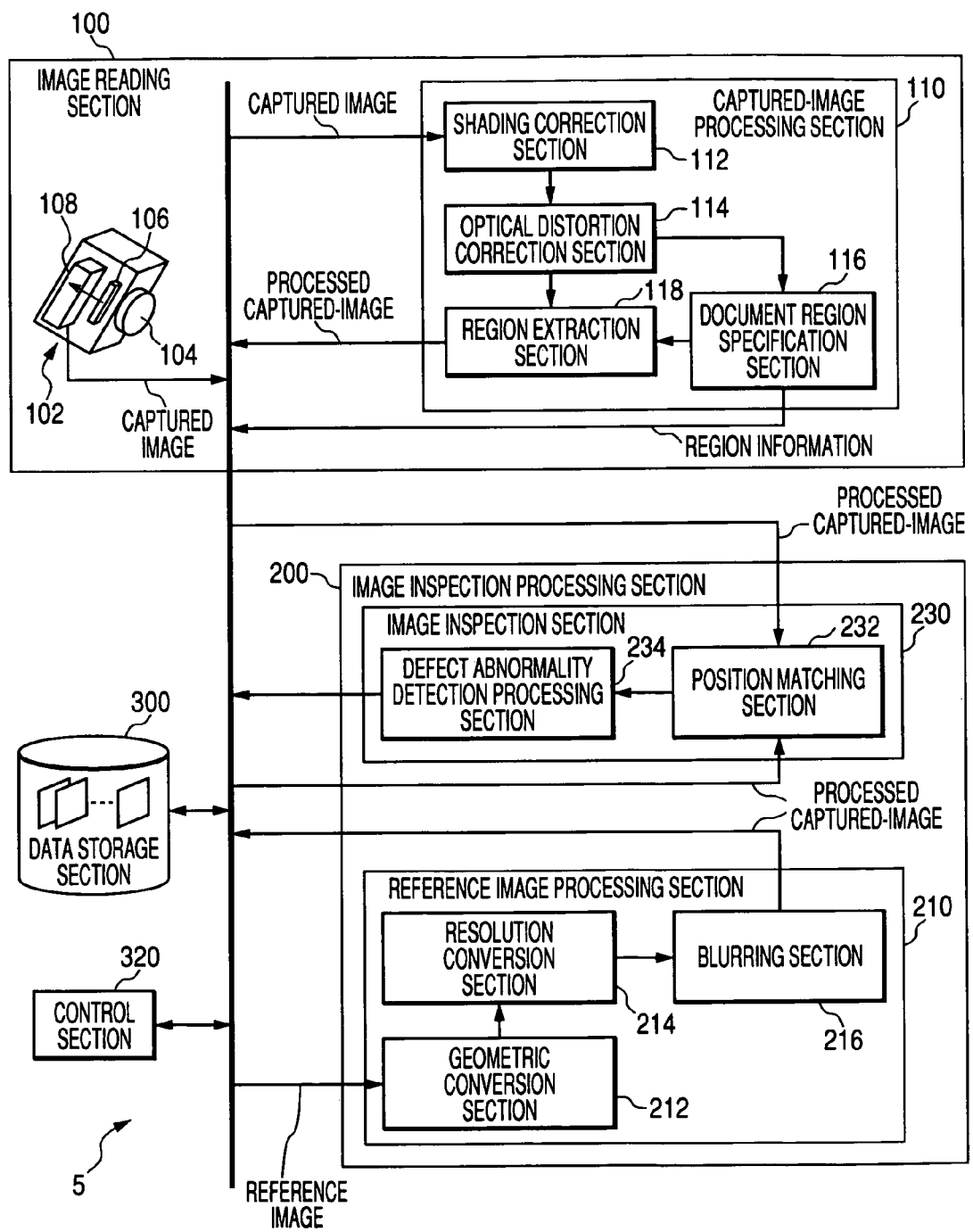
FIG. 3 is a block diagram showing details of the image inspection device 5 shown in FIG. 2.

FIG. 3 is a block diagram showing details of the image inspection device 5 shown in FIG. 2. The image inspection device 5 of this embodiment has the image reading section 100 for acquiring a captured image by capturing an image, the image inspection processing section 200, the data storage section 300, and a control section 320 for controlling the sections of the image inspection device 5.

The data storage section 300 holds captured images, which have been captured by the camera head 102, processed images, which have been processed by a captured-image processing section 110, and various intermediate calculation results used for processing of the image inspection.

The image reading section 100 has the captured-image processing section 110 for performing a predetermined processing with respect to a captured image acquired by the camera head 102. The captured-image processing section 110 has a shading correction section 112 and an optical distortion correction section 114. The shading correction section 112 corrects illumination unevenness (light amount distribution characteristics of optical systems) of a captured image read by the camera head 102 and sensor pixel characteristics variation. The optical distortion correction section 114 mainly corrects distortional (curvature) aberration caused by the image-capturing lens 104 in the captured image shading-corrected by the shading correction section 112. The captured-image processing section 110 also has a document region specification section 116 and a region extraction section 118. The document region specification section 116 specifies a region of the document P in the captured image. The region extraction section 118 extracts a necessary portion (the region of the document P) from the captured image the distortional aberration of which has been corrected by the optical distortion correction section 114, with reference to information on the document region specified by the document region specification section 116.

Shading correction performed by the shading correction section 112 is processing for correcting illumination unevenness in a captured region and characteristics variation of pixels of the CCD image capturing element 106. For example, the camera head 102 captures a white sheet in advance and stores this data as white reference data DW[i,j] in the data storage section 300. Here, i and j denote a pixel position. Next, the shading correction section 112 corrects the captured image D[i,j] on the basis of the equation (1).

$$P[i,j]=D[i,j]/DW[i,j]*(2^n-1) \qquad \text{[Equation 1]}$$

"*" represents multiplication, and "^" represents exponentiation.

Here, "n" represents a bit resolution after correction, and n=8 in the case of an 8-bit resolution, and "n" takes "0 to 255" tone values. Herein, a method for holding white reference data for all pixels is described. However, for example, simply, a method of regarding peak values of the entire captured image as white reference DW or a method of regarding peak values DW[j] of each line as white references may be adopted.

The optical distortion correction section 114 corrects aberration caused by the image-capturing lens 104 as follows. For example, when it is assumed that an aberration at an incidence angle θ onto the image-capturing lens 104 is defined as d, a distance from the image-capturing lens 104 to an image plane of the CCD image capturing element 106 is defined as c, and a distance from the optical axis to the image forming position on the image plane is defined as r, the aberration d is expressed by the following equation (2). Therefore, the optical distortion correction section 114 corrects the distortional aberration on the basis of this characteristic. Generally, the aberration d is in proportion to the cube of r, so that the distortional aberration may be corrected by determining the constant of proportion on the basis of the lens characteristics.

$$d=r-c*\tan\theta \qquad \text{[Equation 2]}$$

The document region specification section 116 extracts a document region from a captured image for each capturing by the camera head 102. The region extraction section 118 extracts a portion of the document P in the captured image as a captured image range, which an object to be compared with a reference image, with reference to document region information extracted for each capturing.

It may be also conceived to regard that a position where a document P is discharged and an orientation of the discharged document P are constant to some degree and therefore to fix the extraction portion. However, actually, vertical and horizontal positions of a document P on the discharge tray 71 may deviate and a document P may be discharged obliquely. In such a case, if the extracted portion were fixed, a document portion could not be accurately extracted. If a portion other than the document is extracted as a captured image range to be compared, such a portion may be erroneously detected as a defect. Therefore, as described in this embodiment, an actual portion of the document P is specified for each capturing, and this specified portion is extracted. Thereby, the document portion can be accurately extracted, resulting in accurate defect detection.

Furthermore, a correction coefficient calculation section and a an image correction processing section disclosed in JP-A-2003-141520 may be employed as a mechanism for performing an error correction to reduce an error between an captured image read by the camera head 102 and the reference image for inspection. Here, the entire disclosure of JP-A-2003-141520 is incorporated herein by reference in its entirety. It is recommended to refer to JP-A-2003-141520 for details of the correction coefficient calculation section and the image correction processing section.

For example, the image correction processing section applies an edge enhancement filter, which is generally used in an image processing, to a captured image acquired by the camera head 102 to perform an enhancement processing (sharpness processing) or an example of a noise reduction section for reducing a noise component contained in the captured image. As the noise reduction section, the image correction processing section performs a noise elimination processing (smoothing processing) by applying a smoothing filter to eliminate moire or smoothing intermediate halftone data to reduce a noise component contained in the captured image.

The correction coefficient calculation section calculates a blur characteristic correction coefficient for correcting position dependency of blur caused by tilt scanning of the captured image acquired by the camera head 102. For example, the correction coefficient calculation section calculates a correction coefficient for enhancement processing or noise elimination processing in units of lines from a trapezoid document region, and sets the calculated correction coefficient to the image correction processing section.

When performing the enhancement processing or the smoothing processing, the image correction processing section adjusts filter parameters by the correction coefficient calculated by the correction coefficient calculation section. In this case, more preferably, the degrees of sharpness and noise elimination are both changed in the units of lines, that is, the enhancement processing and the noise elimination processing are performed simultaneously in the units of lines.

The image inspection processing section 200 has a reference image processing section 210 and an image inspection section 230, as with a configuration disclosed in JP-A-2003-141520. The reference image processing section 210 performs resolution conversion and blurring processing (smoothing processing) with respect to the reference image (original images data), which is used as criteria of the image inspection and stored in the data storage section 300, in the same manner as those with respect to the captured image acquired by the camera head 102 to reduce errors appearing when comparing the captured image with the reference image. The image inspection section 230 inspects whether or not the captured image is good on the basis of the reference image output from the reference image processing section 210.

The reference image processing section 210 has a geometric conversion section 212, a resolution conversion section 214, and a blurring section 216. The geometric conversion section (also referred to as a transparent transformation section) 212 transforms (transparent-transforms) the reference image read from the data storage section 300 into a shape same as that of the document region with reference to the document region information specified by the document region specification section 116. The resolution conversion section 214 performs a resolution conversion processing with respect to the transparent-transformed image by using linear interpolation. The blurring section 216 performs blurring to reduce high frequency components of the reference image, which has been subjected to the resolution conversion processing.

In this embodiment, the camera head 102 captures an image of the document P from the oblique and upper direction, so that the rectangular document P deforms into a trapezoid on the captured image data with respect to the captured image area. The geometric conversion section 212 converts the rectangular reference image so as to match the trapezoid of the captured image.

The blurring section 216 adjusts (generally, lowers) sharpness of the reference image for inspection on the basis of the dispersion σ of the Gaussian function (that is, by using a Gaussian filter) so that the degree of blurring of the reference image to which the resolution conversion has been performed by the resolution conversion section 214 matches that of the captured image. Namely, the blurring of the captured image data caused by the optical systems of the camera head 102 is reflected. In this case, the bulurring section 216 calculates a correction coefficient for Gaussian filtering with reference to the trapezoid of the document region specified by the document region specification section 116, and performs the blurring (Gaussian filtering) with respect to the trapezoid reference image, which has been transparent-transformed, on the basis of the calculated correction coefficient. The Gaussian filtering to which the dispersion σ has been applied is a known technique as disclosed in U.S. Pat. No. 5,351,314, and detailed description thereof is omitted. Here, the entire disclosure of U.S. Pat. No. 5,351,314 is incorporated herein by reference in its entirety.

Figure 4:
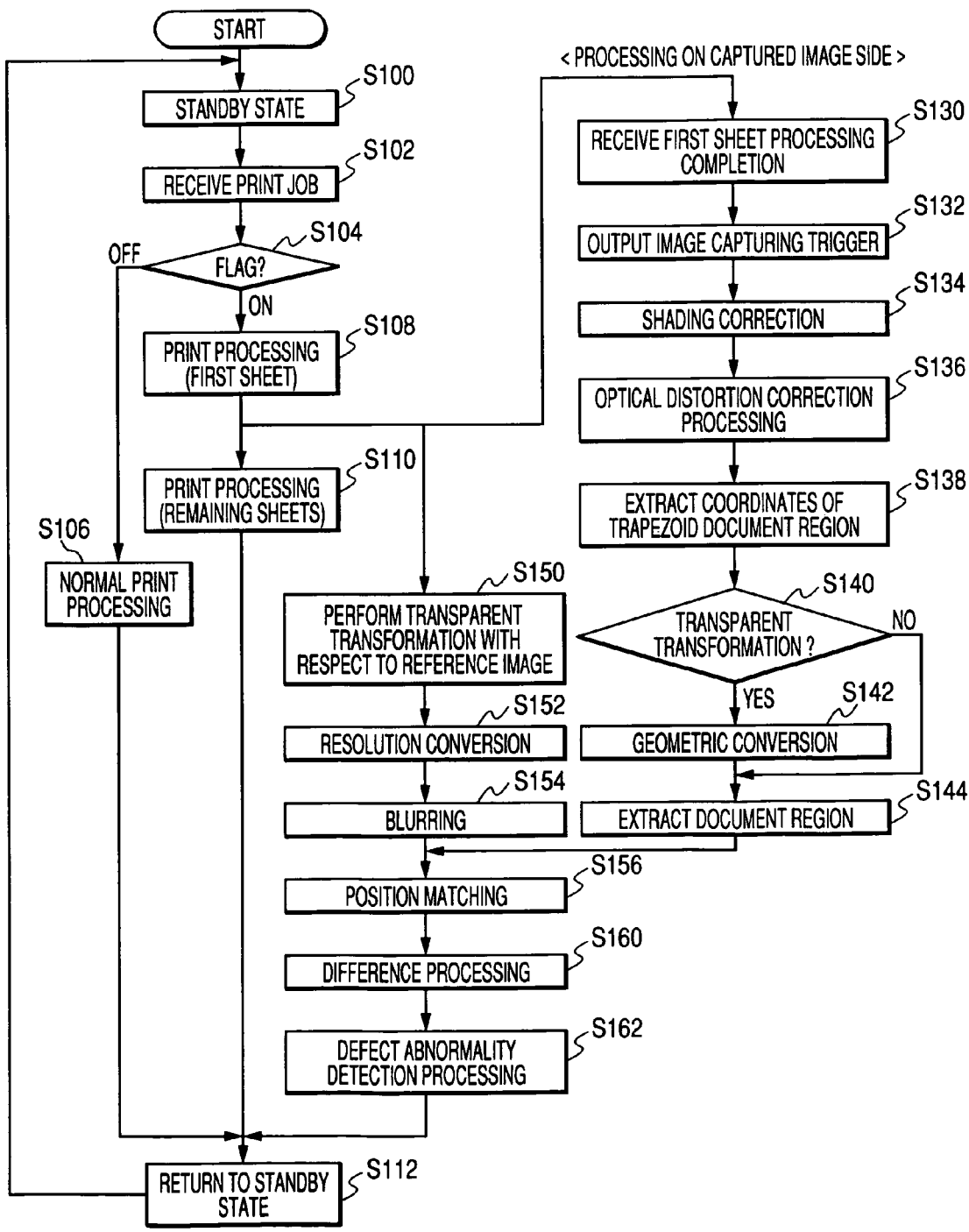
FIG. 4 is a flowchart showing processing procedures in the image inspection device 5 configured as shown in FIG. 3.

FIG. 4 is a flowchart showing processing procedures in the image inspection device 5 configured as described above. In the image inspection device 5 of the above-mentioned embodiment, when a printer section 500 is in a stand by state, the camera head 102 periodically captures an image of the discharge tray 71 in response to an instruction of the control section 320 and outputs the captured image.

The control section 320 compares the image of the discharge tray 71 stored in the data storage section 300, which is an example of the reference image, and the captured image acquired by the camera head 102, judges whether or not a document exists on the discharge tray 71. When a document exists on the discharge tray 71, the control section 320 turns off a flag indicating that image inspection is possible and continuously remains in the stand by state. On the other hand, when no document exists on the discharge tray 71, the control section 320 turns on the flag indicating that image inspection is possible and continuously remains in the stand by state (S100).

Then, when the control section 320 receives a print job during its standby state (S102), the control section 320 judges whether or not the flag indicates that image inspection is possible (S104) Then, if the flag indicating that image inspection is possible is turned off (S104-NO), the control section 320 makes the image output section 30 perform normal printing (S106), and then returns to the standby state (S180). On the other hand, when the flag indicating that image inspection is possible is turned on (S104-YES), the control section 320 executes image inspection for N-th sheet of the print job (as a matter of course, the first sheet at the beginning).

Namely, the control section 320 makes the image output section 30 start printing for the N-th sheet (as a matter of course, the first sheet at the beginning) (S108), and outputs expanded image data to the image output section 30, and then stores the data in the data storage section 300. Then, when rendering of the last image data is finished, the control section 320 waits for a signal indicating the first sheet processing completion from the image output section 30 (S130). When a completion signal arrives, the control section 320 transmits an image capturing start trigger signal to the camera head 102 after a regulated time (S132).

The camera head 102 releases the shutter (captures an image) in synch with the trigger signal, and this timing is immediately after the document P (print output sheet) is discharged onto the discharge tray 71. The camera head 102 stores the trapezoid captured image obtained by capturing the image of the rectangular document, into the data storage section 300.

When the print job involves a plurality of sheets (N sheets), the control section 320 advance sprinting processing for residual sheets along with the processing described later (S130 to S162) until the processing is completed for the plurality of sheets (N sheets). These processes are shown like parallel processing in FIG. 4. However, they may be executed one by one in time division. When processing is completed for all the plurality of sheets (N sheets), the control section 320 returns to its standby state (S112). Thereby, all captured images acquired by the camera head 102 are converted into digital signals and stored in the data storage section 300.

The captured-image processing section 110 performs pre-processing with respect to the captured images acquired by the camera head 102. Namely, the shading correction section 112 reads out captured images acquired by the camera head 102 from the data storage section 300, and performs the shading correction for correcting illumination unevenness and sensor pixel characteristic variation (S134). Furthermore, the optical distortion correction section 114 performs the optical distortion correction with respect to the shading-corrected images to correct distortional aberration of the image-capturing lens 104, and stores the processed image data in the data storage section 300 (S136).

Furthermore, from the captured image that has been subjected to the shading correction and the optical distortion correction, the document region specification section 116 extracts coordinate points A, B, C, and D, which represent a trapezoid document region, by using differences between the color of the discharge tray 71 on the background and white color on the edges of the document P and using the edge detection. The document region specification section 116 also informs the region extraction section 118 of the information on the extracted four-point coordinate values, and stores the information in the data storage section 300 (S138).

Next, the control section 320 determines whether or not the transparent transformation is to be performed with respect to the captured image that has been subjected to the shading correction and the optical distortional correction by the captured-image processing section 110 (S140). In this embodiment, the transparent transformation is performed with respect to the reference image without performing the transparent transformation with respect to the captured images, so that the transparent transformation (S142) for the captured images is omitted (S140-NO).

In the case where transparent transformation is performed with respect to the captured images (S140-YES), the control section 320 instructs the geometric conversion section provided on the captured-image processing section 110 side that is not shown in FIG. 3 to perform the transparent transformation. The geometric conversion section that ahs received this instruction reads the shading-corrected captured image from the data storage section 300, extracts a trapezoid document region by means of edge detection from this captured image, calculates a correction coefficient prior to the transparent transformation from the oblique sides of the trapezoid, and in actuality, transparent-transforms the trapezoid document region into a rectangle (S142).

The region extraction section 118 extracts a document region in the captured image acquired by the camera head 102 as a captured image range to be inspected (S144). In this embodiment, the region extraction section 118 extracts a trapezoid region surrounded by the coordinate values of the four apexes extracted by the document region specification section 116 as an captured image range to be inspected, and stores image data indicating the image in this extracted trapezoid document region in the data storage section 300.

In the case where transparent transformation is performed with respect to the captured image, the document region specification section 116 notifies the region extraction section 118 of the information on the coordinate values of the coordinate points A, B, C, and D of the document region that has been transparent-transformed into a rectangle (S138) while storing the information in the data storage section 300. The region extraction section 118 extracts the region surrounded by the coordinate values of the four apexes extracted by the document region specification section 116 from the captured image that has been acquired by the camera head 102 and subjected to the transparent transformation as a captured image range to be inspected (S144).

Next, the geometric conversion section 212 of the reference image processing section 210 reads image data indicating the original image, which is a reference image and has been subjected to printing processing, and information indicating the coordinate values of the four apexes of the captured image extracted by the document region specification section 116 from the data storage section 116. Then, first, the geometric conversion section 212 calculates a correction coefficient necessary for the transparent transformation on the basis of the coordinate values of the four apexes of the captured image, and performs the transparent transformation with respect to the reference image so as to match the trapezoid form of the captured image by applying the calculated correction coefficients (S150).

Next, the resolution conversion section 214 converts the resolution of the reference image so that the size of the trapezoid reference image becomes equal to that of the trapezoid captured image to be inspected (S152).

Next, in order to reflect blurring caused by the optical systems of the camera head 102 in the captured image data to the transparent-transformed reference image, the blurring section 216 calculates a correction coefficient value gx corresponding to the trapezoid form of the image to be used for Gaussian filtering with reference to the apex coordinates A, B, C, and D indicating the trapezoid extracted by the document region specification section 116. Based on the calculated values, the blurring section 216 performs the blurring (Gaussian filtering) to the trapezoid reference image that has been transparent-transformed, and stores the filtered image in the data storage section 300 (S154).

Herein, the reason for performing blurring with respect to the reference image is that performing the same level of blurring as the blurring characteristic of the captured image realizes blurring corresponding to the blurring distribution of the captured image, and this minimizes errors in a difference processing described next.

Next, a position matching section 232 starts positional matching between the reference image subjected to the blurring by the blurring section 216 of the reference image processing section 210 and the captured image pre-processed by the image reading section 100 (S156). For example, the position matching section 232 performs positional matching by means of so-called template matching in which normalized cross-correlation coefficients are calculated one by one while scanning inside the captured image by using the reference image as a template, and a point having the highest correlation coefficient is regarded as a positional matching point.

Next, a defect abnormality detection processing section 234 has an image-quality-defect detection function for detecting an image defect by comparison between the read image and the reference image, and a defect state analysis function for analyzing a state of the defect detected by the image-quality-defect detection function. For example, the defect abnormality detection processing section 234 performs a difference processing for obtaining a difference (comparing) between the captured image to be inspected (trapezoid), which has been pre-processed by the captured-image processing section 110 and has been stored in the data storage section 300, and the reference image (trapezoid), which has been subjected to transparent transformation and blurring by the reference image processing section 210 (S160). Then, the defect abnormality detection processing section 234 detects existence of a defect or abnormality in the captured image (S162). The position matching section 232 and the defect abnormality detection processing section 234 perform the above-mentioned processing for the entirety of the reference image, and returns to its standby state after completion of the processing.

For example, when the normalized cross-correlation coefficient on the optional matching point is lower than a judgment index value, the defect abnormality detection processing section 234 concludes that an image defect exists on this point and executes defect abnormality detection processing. Accordingly, when a defect pattern such as a black point is found in the print output, that is, the captured image, the normalized cross-correlation coefficient remarkably lowers at the area including this defect. Therefore, the black point appears in the results of difference processing.

Therefore, for example, when a proper density threshold is set and the results of difference processing are binarized, a black point can be specified and existence of an image defect can be easily judged. This can be used not only for detection of local image defects such as a black point, but also for detection of the defect form, size, density, contour condition, orientation, periodicity, and defect occurring regions, as observation data information (ND180) relating to the output image serving as an index indicating characteristics of a defect in the output image used for the image diagnosis as well as detection of image quality failure such as density unevenness and density shift of the entirety of the captured image.

When the defect abnormality detection processing section 234 detects an image defect or an image poor quality, the image inspection device 5 automatically activates the processing for specifying a failure occurring point with respect to the failure diagnosis apparatus. Alternatively, instead of automatically activation, the image inspection device 5 may issue a warning on an unillustrated user interface such as a predetermined display device or a sound signal generator (for example, a speaker), or may issue a warning to a client terminal (for example, a personal computer), which attempts to perform printing via a communications networks, and furthermore, informs a printer maintenance servicer through a communications networks via a remote maintenance system. Thereafter, after receiving an instruction for the failure diagnosis apparatus, the processing for specifying a failure occurring point is activated.

As described above, instead of converting a captured image into an image viewed from a front side (that is, restoring into a rectangular image) and comparing the converted image with the reference image, which is an original image, the image inspection device 5 of the above-mentioned embodiment performs the transparent transformation to the reference image so as to match shape (generally, trapezoid) of the captured image caused by capturing conditions, and compares both the captured image and the reference image, which are not rectangular (trapezoid in the example). The transparent transformation for the reference image does not require interpolation in which pixel values of many pixel points are calculated from a small number of pixel points, so that a problem in that the reliability of the data after transparent transformation lowers does not occur. Therefore, existence of an image defect can be inspected more accurately.

Furthermore, according to this idea, processing for optical distortion should distorts a reference image to match a shape of the reference image with that of a captured image, instead of correcting the captured image. However, change amount of image information due to optical distortion correction is much smaller than shape change amount due to the transparent transformation, and influence on the defect detection accuracy is very small. In addition, in the case of the image defect inspection, it is quite simple processing to compare images having no distortion rather than to compare images having optical distortions. Therefore, as shown in the above-mentioned embodiment, performing optical distortion correction with respect to the captured image results in improvement in performance of the entire image defect inspection system.

Furthermore, apex coordinates of a document region are extracted to specify the document region for each capturing, a correction coefficient for transparent transformation with respect to the reference image are calculated on the basis of information on the specified document region, and transparent transformation is performed with respect to the reference image by applying the calculated correction coefficients. Accordingly, transparent transformation according to the actual imaging conditions can be performed with respect to the reference image. Therefore, regardless of the document discharge condition, accuracy in comparison and inspection between the captured image and the reference image is improved. It also becomes possible to inspect image defects and image abnormalities with excellent inspection accuracy.

In addition, since blurring is performed with respect to the reference image on the basis of the information on the specified document region, blurring according to the distribution of the blur level depending on positions caused by tilt-scanning can be performed with respect to the reference image according to the actual imaging conditions. As a result, a comparative image having a blurring property close to that of the captured image can be generated.

Thus, when transparent transformation and blur correction processing are performed with respect to the reference image without image processing to the captured image, errors in a difference processing performed in the defect abnormality detection processing section 234 are significantly reduced, whereby a more accurate inspection can be made.

The mechanism of the image inspection device 5 described above uses a method (ND172, ND174) of automatically reading a print image processed by the image output section 30 by means of an area sensor or a line sensor near the discharge tray 71 when the print image is discharged onto the discharge tray 71. However, any method for reading an image to be inspected may be employed. Even when a method (ND174) of automatically reading, by means of a line sensor, a sheet being conveyed on which an image has been formed or a method of manual reading in which a user's operation is required, these methods have no influence on the processing of the image defect inspection. However, in a method of reading from an oblique direction, a processing relating to a distortion correction is not required.

<<Failure Diagnosis Function in Image Forming Apparatus>>

<Outline of Failure Diagnosis Function>

Figure 5:
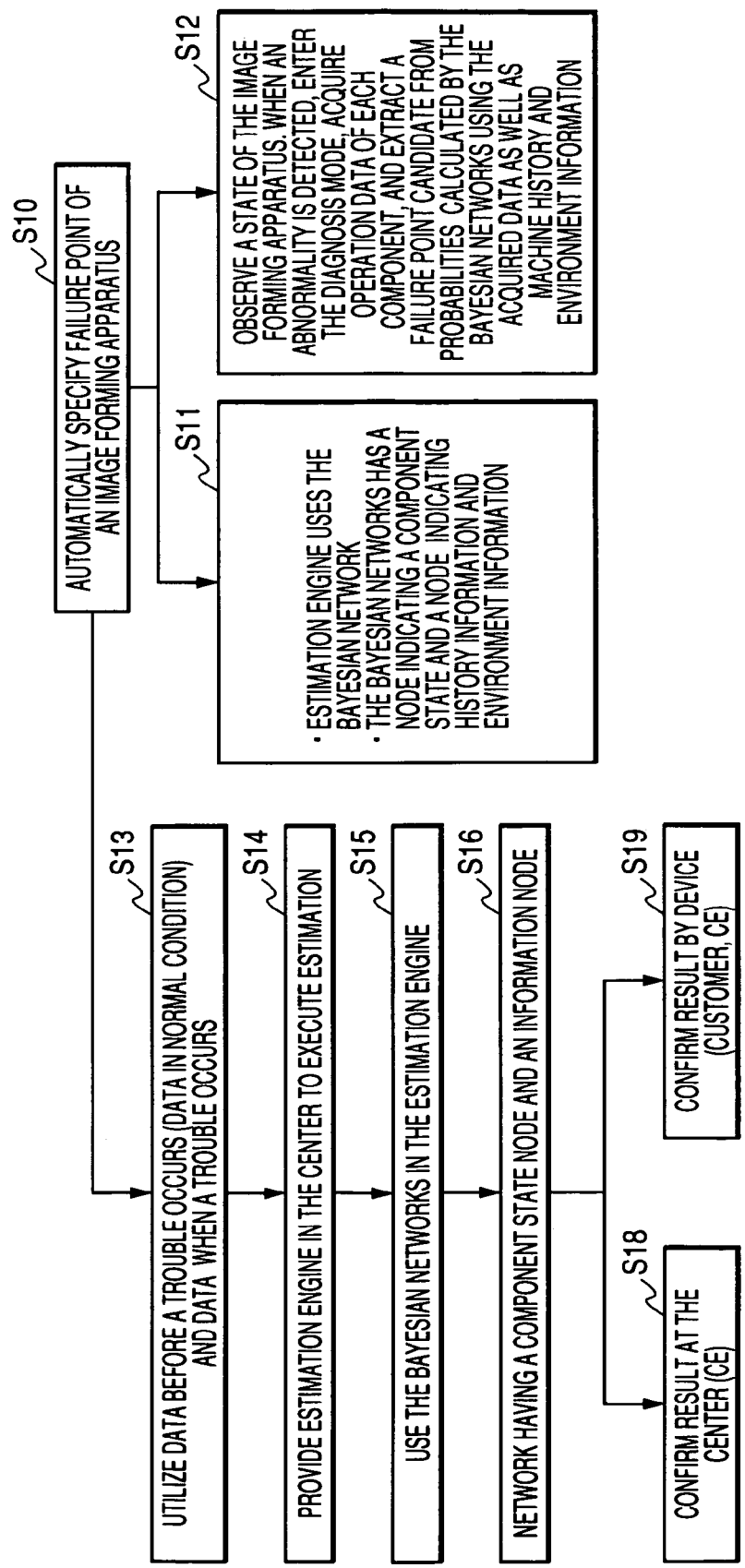
FIG. 5 is a diagram (No. 1) showing outline of functions of a failure diagnosis apparatus provided in the image forming apparatus 1.
Figure 6:
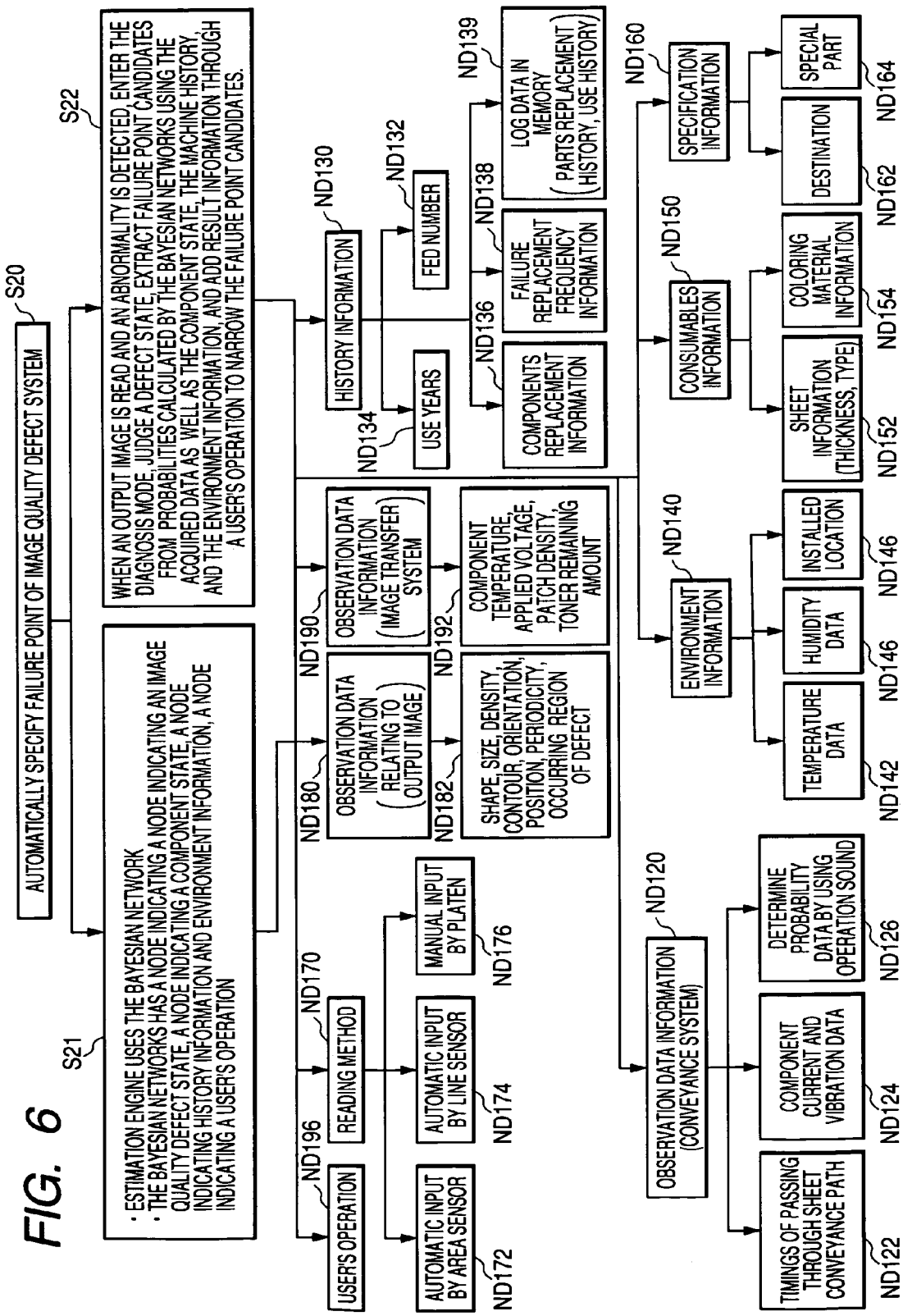
FIG. 6 is a diagram (No. 2) showing the outline of the functions of the failure diagnosis apparatus provided in the image forming apparatus 1.

FIGS. 5 and 6 show outline of a function of a failure diagnosis apparatus provided in the image forming apparatus 1.

When the failure diagnosis apparatus automatically executes failure diagnosis for specifying a failure point of an image forming apparatus (S10), the failure diagnosis apparatus, as a diagnosis architecture, acquires normal data before a trouble occurs, acquires data on state of an apparatus during operation and environmental conditions (collectively referred to as working data), and executes diagnosis with utilizing these pieces of information and referring to failure probabilities calculated by an estimation engine (S13). The failure diagnosis mentioned in this embodiment includes not only judgment on occurrence of failure but also predicting diagnosis for predicting future failures.

A function portion of the estimation engine and a function portion for executing failure diagnosis are not limited to a configuration installed in a main body of the image forming apparatus. For example, the function portions may be provided in an administration center network-connected to the image forming apparatus 1 (S14). In this case, the normal data and the working data are transmitted to the administration center via a network and diagnosis is executed at the administration center. Alternatively, it is also possible that only the estimation engine is placed in the administration center, and only calculation of failure probabilities is executed at the administration center. The results of diagnosis may be confirmed by a customers engineer (CE) at the administration center, or confirmed by a customers engineer or a customer (client/user) on the image forming apparatus 1 side by transmitting the results of diagnosis to the image forming apparatus 1.

In this embodiment, the Bayesian network is used as the estimation engine for calculating the failure probabilities (S11, S15). The failure diagnosis using the Bayesian network utilizes a stochastic model genetic algorithm for generating searching points with using statistical information of preferable individuals in a population, which is an optimization approach in which dependency among nodes (variables) are probabilistically grasped, and distribution is estimated by using a graph structure (called the Bayesian network or causal networks).

The Bayesian network use a probabilistic modeling genetic algorithm that generates search points with using statistical information on individuals of the population, and is an approach for estimation of distribution by using a graph structure (called the Bayesian network or causal network) through probabilistic grasping of the dependency among nodes (variables).

More specifically, first, random variables (X: {true, false}/{Mon, Tue, . . . })/continuous variable) are provided for nodes. Then, with respect to an effective link having dependency between a parent node and a child node, a graph structure is given concerning qualitative dependency. With regard to quantitative dependency, a conditional probability (table/parameric model) is given.

Then, in the failure diagnosis, the automatically acquired information is analyzed to specify failure probability of a node forming the model such as the Bayesian network model used when modeling the cause, which causes failure of the diagnosis target apparatus and analyzing. Candidates of a failure point or a point where failure would occur are extracted based on the failure probability.

When failure causes cannot be narrowed, by using information acquired under different operation conditions, failure probabilities of nodes are specified by analyzing the automatically acquired information in the same manner, whereby candidates being in failure or having the possibility of failure are extracted. Namely, failure probabilities acquired under different operation conditions are judged in a comprehensive manner to accurately judge a failure cause.

As described in detail later, when failure diagnosis of the image forming apparatus 1 is executed by using the Bayesian network, the Bayesian network is formed to have a network configuration including, as constituent components of the Bayesian network, a component state node having a state indicating whether or not a component is in failure and plural information nodes, which are connected to the component state node and have a causal relationship with the component states (S16).

As an example, in a case of automatically executing a failure diagnosis for specifying a failure point of an image quality defect system, the Bayesian network is configured to have a node indicating an image quality defect state, a node indicating a component state and history information node, anode indicating environment information, and anode indicating a user's operation (S21). Then, after an image formation is performed in a predetermined operation condition, a predetermined reading device reads the output image and it is judged whether or not the output image has an image quality defect.

Herein, when an image quality defect is detected, a diagnosis mode is entered. Then, the defect state is judged, and failure probability is calculated by using the data, a component state, machine history environment information as well as the Bayesian network, and failure point candidates are extracted based on the calculated failure probability. In this case, if it is difficult to narrow the candidates down to one failure point candidate, further result information through user operations is added, a failure probability is re-calculated, and a failure candidate is narrowed from the result of this re-calculation (S22)

Therefore, the failure diagnosis apparatus directly acquires, for example, observation data information (ND120) of the conveyance system, history information (ND130), environment information (ND140), consumables information (ND150), or specification information (ND160) of the image forming apparatus 1 as information (variables: nodes) for determining parts failure probabilities, by using data acquisition application software.

Furthermore, as information unique to this embodiment, which makes it possible to execute a failure diagnosis relating to an image quality defect, a method for reading an output image formed by the image forming apparatus 1 (ND170), observation data information (ND180) relating to an output image, and observation data information (ND190) of the image transfer system are also directly acquired by using data acquisition application software. In this embodiment, user's operation information (ND196) is also acquired as appropriate.

The observation data information (ND120) of the conveyance system corresponds to a component observation information node ND2 of the Bayesian network, and gives apparatus operation state variables. Specifically, the observation data information is acquired on the basis of information on current, vibration, and time representing component operation states acquired by using sensors (component information). In this embodiment, this component information is automatically acquired by providing various sensors inside the image forming apparatus 1.

For example, the observation data information may have the timings (ND122) of passing through the sheet conveyance path on the basis of sheet conveyance time information acquired by the sheet timing sensors 69; current information showing operation states of components (parts), in particular, the drive members such as motors, solenoids, and plungers; vibration data (ND124) acquired by an acceleration sensor used as the vibration sensor 82 of the drive mechanism vibration detection section 80; or operation sounds (ND126) acquired by an acoustic sensor used as the vibration sensor 82 of the drive mechanism vibration detection section 80. For example, probability data may be determined on the basis of acquired operation sounds.

The current information showing operation states of the drive members is acquired in the way where a component (motor, solenoid, and clutch) inside the image forming apparatus 1 is operated singly and drive current at that time is acquired (described in detail later, see FIG. 6).

The history information (ND130) corresponds to history information node ND3 of the Bayesian network and represents use state of the image forming apparatus 1. The history information has a function of reinforcing the component information that provides the apparatus operation state variables. In this embodiment, this history information is automatically acquired by disposing various sensors inside the image forming apparatus 1 and storing acquired information in a storage medium.

For example, the history information may have a sheet fed number (ND132) corresponding to number of printing sheets fed out to the conveyance path 52 from the paper feed tray 51, that is, corresponding to number of accumulated printings, number of used years (ND134) of the image forming apparatus 1 (machine) since the installation of the image forming apparatus 1, use frequency (ND135) calculated from the sheet fed number in a unit period, component replacement information (ND136), failure and replacement frequency information (ND138), and log data (ND139) including parts replacement history and use history stored in a nonvolatile storage medium (semiconductor memory or hard disk) provided inside the image forming apparatus 1.

For example, the sheet fed number indicating the number of times of conveyance of the printing sheets, which is one example of the member to be conveyed, directly influences wearing of rolls, wearing of gears, or wearing of bearings of motors, and influences the states of components. Therefore, it is effective that information (sheet fed number: ND132) as to how many sheets the feed section fed since installation of the image forming apparatus 1 at a predetermined location or replacement of a component as history information is managed for each component and failure diagnosis is executed with reference to this information.

If data in which apparatus history (use conditions) and apparatus installation environments that influence the states of components are taken into account in addition to the component information are automatically acquired to calculate probabilities and the probabilities are incorporated into the Bayesian network to execute calculation, it is possible to perform accurate failure diagnosis with requiring easy operations but not requiring advance knowledge. Even a serviceman who has no advance knowledge or is inexperienced can perform accurate failure diagnosis with easy operations.

Number of fed sheets since new installation of the image forming apparatus 1, consumables replacement, or parts replacement is used as the sheet fed number (ND132). This sheet fed number involves wearing, so that it influences lives of all movable parts (motors, solenoids, clutches, rolls, gears, and belts). A threshold value serving as criteria of deterioration of each part such as motors and solenoids is, for example, 500,000 sheets (this number differs depending on the unit type and parts types). Probability is set based on this threshold value. The accumulated sheet fed number, which a customer has used since new installation, consumables replacement, or parts replacement, is successively recorded in a nonvolatile storage medium provided inside the image forming apparatus 1 for each part. Thereby, this value determines probabilities as the observation information at a time of diagnosis.

The sheet fed number of each part is reset to zero when the part is replaced. Therefore, although the accumulated fed numbers of all parts are zero at the time of new installation, the fed number stored in a nonvolatile recording medium differs among parts, depending on maintenance of the image forming apparatus.

The environment information (ND140) corresponds to environment information node ND4 of the Bayesian network and shows operation environments of the image forming apparatus 1. The environment information is surrounding environmental conditions that influence the component states. In this embodiment, the environment information shows operation environments regarding the operations of, in particular, the drive mechanism section 90. For example, the environment information includes temperature data (ND142) acquired by the temperature sensor 85 of the working temperature detection section 84, humidity data (ND144) acquired by the humidity sensor 87 of the working humidity detection section 86, and installed location (address and building, or latitude, longitude, and altitude) (ND146) of the image forming apparatus 1, which influences the temperature data and the humidity data.

The temperature and humidity influence the coefficient of friction between the feed roll 55a of the pair of paper feed rolls 55 and a printing sheet and the coefficient of friction between sheets, and influence the sheet conveyance time. Therefore, it is effective that failure diagnosis is made with using the temperature data and the humidity data. It influences failure of the image forming apparatus 1 whether or not the image forming apparatus 1 is used at a location suitable for its specification. Therefore, it is effective to execute failure diagnosis with using an installed location.

Furthermore, the consumables information (ND150) corresponds to consumables information node ND5 of the Bayesian network. The consumables information is information on consumables used in the image forming apparatus 1 such as the printing sheet thickness (sheet thickness information) and the sheet type (ND152), the color type of the coloring material, the type of dye/pigment, and a remaining amount thereof (ND154), which are acquired by the consumable detection section 88.

Furthermore, the specification information (ND160) corresponds to specification information node ND6 of the Bayesian network. The specification information is information for specifying whether or not the image forming apparatus 1 is regular one. For example, the specification information may include destination (ND162) and use of special parts (ND164) at customer's request.

The method for reading an output image (ND170) is unique to execution of image defect failure diagnosis, and indicates a method for reading an output image to be used for image diagnosis. For example, a method may be employed in which a print image that has been processed by the image output section 30 is automatically read by using an area sensor or a line sensor near the discharge tray 71 when the print image is discharged onto the discharge tray 71 (ND172, ND174).

Alternatively, another method may be employed in which an image is automatically read by a line sensor in the process of conveyance of a printing sheet on which an image is formed toward the discharge tray 71 positioned outside the image forming apparatus 1 (ND174). In order to employ this configuration, in the configuration shown in FIG. 1, the line sensor 616 having a length corresponding to a width of a printing sheet is provided between the fixing rollers 45 and the discharge tray 71.

Alternatively, still another method may be employed in which the image reading section 700 of the image forming apparatus 1 or another scanner is used as a reading device, and a user sets the output sheet to the reading device to manually read it (ND176).

The observation data relating to an output image (ND180) is unique to diagnosis of image defect failure, and is an index (hereinafter, also referred to as image detect characteristic amounts) indicating characteristics of defect of an output image to be used for image diagnosis. For example, the observation information includes shape, size, density, contour condition, orientation, position, periodicity, and occurring region of a black defect. Herein, the defect shape means a spot, a black line, a black zone, a blank portion, a white zone, density unevenness, an entirely white colored portion, or an entirely black colored portion. The defect size means a size in a case of a spot, and thickness or length in a case of a line or zone.

The contour condition relates to sharpness, and is expressed as sharp (high in sharpness) or blurred (low in sharpness). The defect orientation is the sheet feeding direction, the main scanning direction, or random. The defect position is a constant position, a position corresponding to a particular part, or random. The defect periodicity indicates whether or not a defect repeatedly appears on a printing sheet or the condition thereof. The defect occurring region indicates shows where defect appears on a printing sheet, and for example, whether defect appears on a sheet edge eliminated area or a sheet back side, etc.

The observation data information (ND190) of the image transfer system is information indicating an operation state of a component relating to image formation, and excludes a signal showing an operation state of a drive member relating to the conveyance system. The observation data information includes, for example, temperature of the fixing rollers 45 temperature of which is monitored at a part level, an applied voltage supplied to the primary charger 33, a patch density detected by the pattern detection section 614, and a toner (coloring material) remaining amount detected by the coloring material remaining amount detection section 89. These pieces of observation data information (ND190) of the image transfer system are stored in a nonvolatile storage medium (for example, a storage medium 532) as setting information necessary for proper image formation.

The user's operation information (ND196) is input of information for re-processing in which when the failure diagnosis apparatus automatically executes the failure diagnosis and provides improper information relating to a failure position (e.g. failure point candidates are not limited to one point), a similar processing is performed with changing condition for the image forming apparatus 1. The user's operation information includes not only an instruction for the re-processing but also information relating to an operation condition after changing.

Likewise, when receiving a user's instruction, the image forming apparatus 1 acquires additional test result information such as the observation data information of the conveyance system (ND120), the observation data information relating to an output image (ND180), and the observation data information of the image transfer system (ND190) in an operation condition different from the previous operation condition.

CONFIGURATION EXAMPLE OF THE FAILURE DIAGNOSIS APPARATUS

Figure 7:
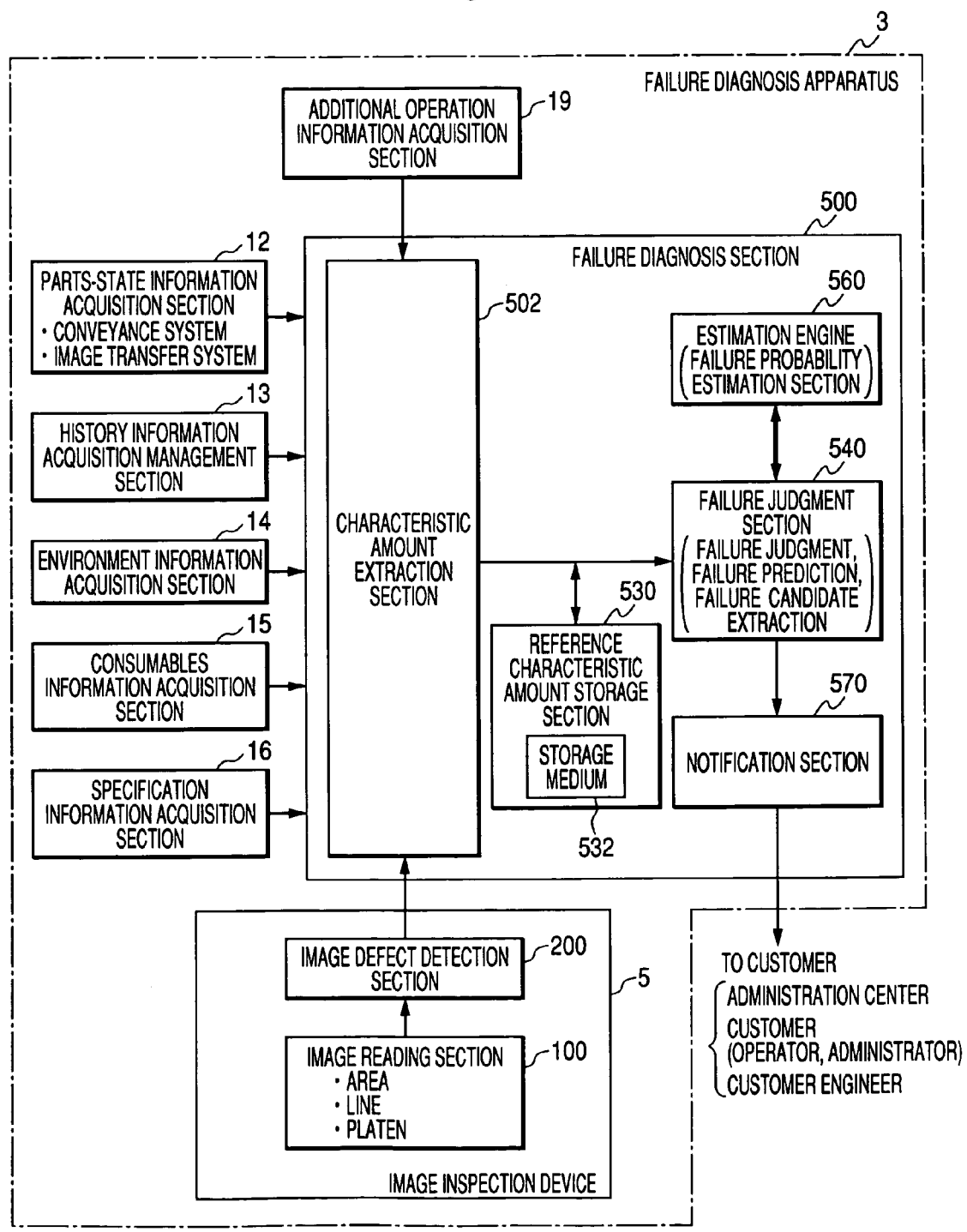
FIG. 7 is a block diagram showing a configuration example of the failure diagnosis apparatus provided in the image forming apparatus 1.

FIG. 7 is a block diagram showing a configuration example of the failure diagnosis apparatus provided in the image forming apparatus 1.

The failure diagnosis apparatus 3 is configured so as to acquire the above-mentioned pieces of information shown in FIG. 6 and execute failure diagnosis. For example, the failure diagnosis apparatus 3 has a parts-state information acquisition section 12 for acquiring component information indicating operation states of components as the observation data information, and a history information acquisition management section 13 for monitoring the use condition of the image forming apparatus 1 and registering/holding monitoring results in the nonvolatile storage medium to manage the history information.

The failure diagnosis apparatus 3 has an environment information acquisition section 14, a consumables information acquisition section 15, a specification information acquisition section 16. The environment information acquisition section 14 acquires surrounding environmental conditions, such as temperature and the humidity that influence the states of the components, as the environment information on the basis of information detected by the working temperature detection section 84 and the working humidity detection section 86. The consumables information acquisition section 15 acquires information on consumables used in the image forming apparatus 1, such as the printing sheet thickness, color of coloring material, type of the coloring material, and remaining amount of the coloring material on the basis of information detected by the consumable detection section 88. The specification information acquisition section 16 acquires the specification information of the image forming apparatus 1.

Furthermore, the failure diagnosis apparatus 3 has the image inspection device 5 and an additional operation information acquisition section 19, which are unique to configuration for executing diagnosis of an image defect failure. The image inspection device 5 has the image reading section 100 and the image inspection processing section 200 as described above. The image reading section 100 reads a print image output from the image forming apparatus 1. The image inspection processing section 200 compares the image read by the image reading section 100 with the reference image to detect an image quality defect and analyzes the detected defect state.

Furthermore, the failure diagnosis apparatus 3 has a failure diagnosis section 500 including a characteristic amount extraction section 502, a reference characteristic amount storage section 530, a failure judgment section 540, an estimation engine (failure probability estimation section) 560, and a notification section 570. The reference characteristic amount storage section 530 stores reference characteristic amounts serving as judgment indexes for a failure diagnosis in a predetermined storage medium (preferably, a nonvolatile semiconductor memory) 532. The failure judgment section 540 performs failure judgment and failure prediction. The estimation engine (failure probability estimation section) 560 estimates failure probabilities used for the failure judgment and the failure prediction executed by the failure judgment section 540. The notification section 570 notifies a customer of results of the failure judgment and the details of inspection.

On the basis of the operation state signals, which indicate the operation state of the drive members while the drive members of the conveyance system operate for a predetermined period and are acquired by the parts-state information acquisition section 12, the characteristic amount extraction section 502 determines characteristic amounts of the operation state signals. Furthermore, the characteristic amount extraction section 502 acquires information not only from the parts-state information acquisition section 12 but also from the history information acquisition management section 13, the environment information acquisition section 14, the consumables information acquisition section 15 and the specification information acquisition section 16, and determines characteristic amounts of the acquired information. The characteristic amount extraction section 502 functions as an operation state signal reception section for receiving operation state signals from the parts-state information acquisition section 12 and other information from the history information acquisition management section 13 and the like.

The reference characteristic amount storage section 530 is provided with, in addition to the storage medium 532, a writing control section for writing reference characteristic amounts into the storage medium 532, and a readout control section for reading-out the stored reference characteristic amounts from the storage medium 532.

The storage medium 532 functions as a history storage section for storing history information of various operation state signals acquired by the characteristic amount extraction section 502 in the image forming apparatus 1.

As the reference characteristic amounts, for example, characteristic amounts acquired by the characteristic amount extraction section 502 in normal conditions where the mechanical members (including drive members such as motors and solenoids) forming the drive mechanism section of the conveyance system and electrical members (the drive signal generation section 150 and the drive circuits) for driving the mechanical members normally operate are used. Or, in place of the characteristic amounts obtained by the characteristic amount extraction section 502, rated values of operation currents and vibrations of the stepping motors and the like in the image forming apparatus 1 may be used.

When failure is detected, characteristic amounts acquired by the characteristic amount extraction section 502 at a time when components fail are used as reference characteristic amounts for judging the failure point or the failure state. The reference characteristic amounts relating to this failure state may be detected by the characteristic amount extraction section 502 in such as manner that the characteristic amount extraction section 502 forcibly causes the members of this image forming apparatus 1 to fail. Alternatively, the reference characteristic amounts relating to the failure state may be information acquired on a basis of maintenance information collected at an administration center or the like. Also, the image forming apparatus 1 and the administration center may connected to each other via networks, and information at a time of failure stored in the storage medium 532 may be periodically updated.

Furthermore, the failure judgment section 540 compares the reference characteristic amounts stored in the storage medium 532 with actual operation characteristic amounts obtained by the characteristic amount extraction section 502 at a time of failure diagnosis to determine whether or not a failure has occurred in a diagnosis target block and/or perform failure diagnosis relating to failure such as possibility of a future failure.

For example, when automatically executing a failure diagnosis for specifying a failure point of the image quality defect system, the failure diagnosis section 500 estimates failure probabilities of points that cause an image quality defect by the estimation engine 560 with defect state information analyzed by the defect abnormality detection processing section 234 of the image inspection processing section 200, the status information of components forming the image forming apparatus 1, history information of the image forming apparatus 1, and information on surrounding environments where the image forming apparatus 1 is installed, and additional test result information obtained by user's operation. Then, the failure diagnosis section 500 extracts candidates of a failure point by the failure judgment section 540 on the basis of the failure probabilities calculated by the estimation engine 560.

The failure judgment section 540 has a function of a failure candidate extraction section for narrowing failure candidates by utilizing the estimation engine 560. The failure judgment section 540 notifies the notification section 570 of the narrowed failure candidate, failure judgment results (occurrence of failure, failure point, and details of the failure), failure prediction results (failure possibility, failure point, and details of the failure) or the details of inspection and acquired operation state signals.

Herein, when executing automatic judgment, if it is hard to narrow candidates of the failure point to one, the failure diagnosis section 500 waits for inputs of additional test result information acquired under a different condition specified by user's operations. Thereafter, the estimation engine 560 re-calculates failure probabilities. The failure judgment section 540 extracts a more proper failure point based on the failure probabilities acquired in the respective operation conditions.

The notification section 570 notifies of the results of failure judgment received from the failure judgment section 540 a customer (an operator or owner of the image forming apparatus 1), a customer engineer who performs maintenance (maintenance, support, management) of the image forming apparatus 1 or a customer engineer and a customer of an administration center administering the image forming apparatus 1.

For example, in the case of directly notifying a customer, notification may be implemented by using an alarm, for example, a display panel or a speaker on the image forming apparatus 1. A customer looks at or listens such a notification and can tell a service center the failure point and details. In the case of directly notifying a customers engineer who maintains the image forming apparatus 1, failure may be informed by using a mobile terminal such as a public phone line, a PDA (Personal Digital Assistant), a portable phone, or a PHS (Personal Handy-phone System). Also, it is possible to transmit a failure point and details of the failure to a terminal that a customers engineer has.

In the case of informing to an administration center, which administers the image forming apparatus 1, a public phone line or a mobile terminal can also be used as with the case of directly notifying a customer engineer. Furthermore, notification by using the Internet is also possible. In these cases, it is also possible to transmit data on a failure point and details of the failure to a terminal of the administration center.

Furthermore, details of inspection in failure diagnosis executed by the failure diagnosis section 500 and data used therein such as the operation state signal may be notified the administration center. In this case, the administration center may narrow failure candidates or specify failure point and details of failure.

<<Configuration Using Electrical Computer>>

Figure 8:
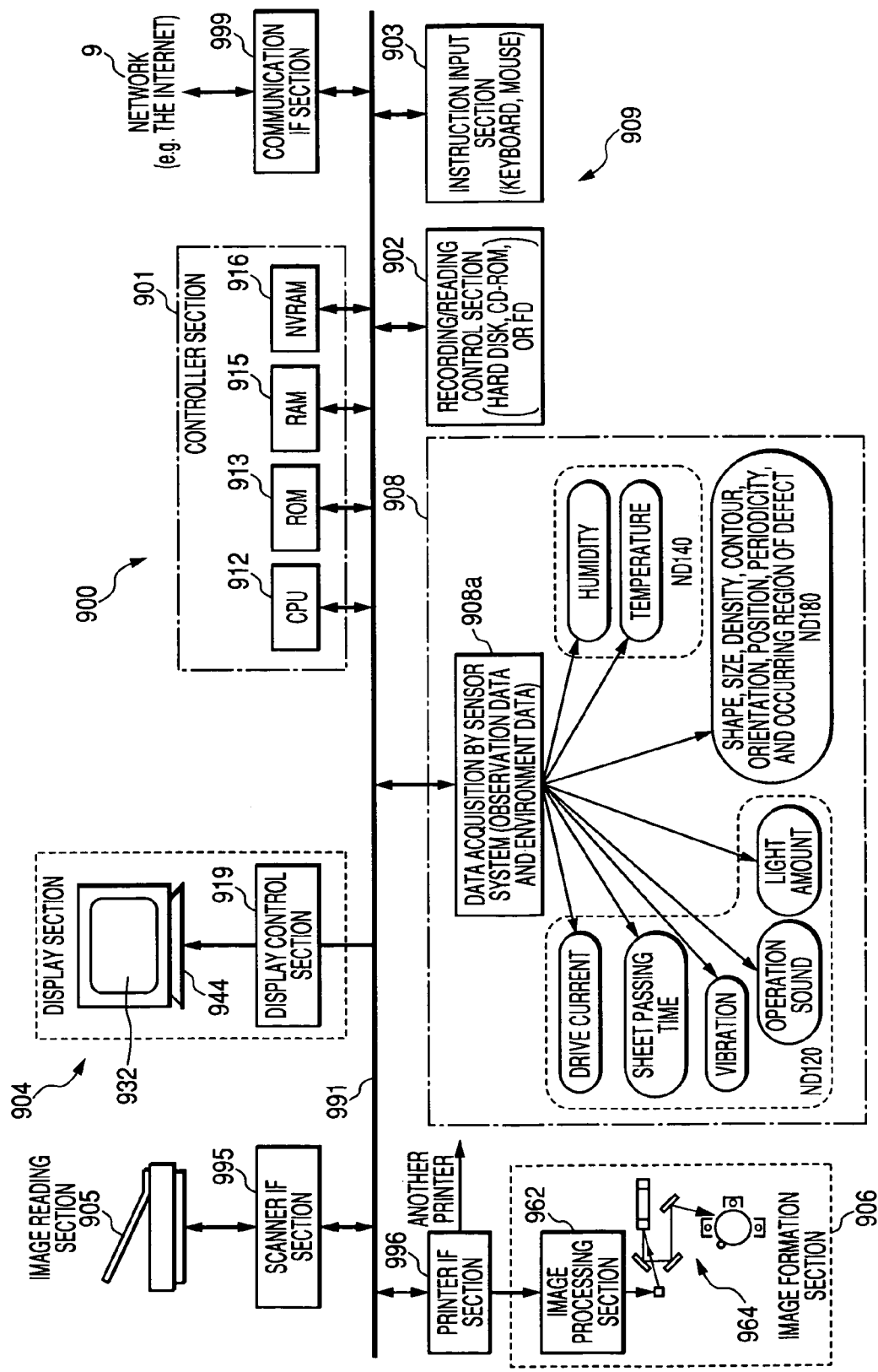
FIG. 8 is a block diagram showing an example of hardware construction in the case where the failure diagnosis apparatus is realized by means of software executed in a computer.

FIG. 8 is a block diagram showing an example of hardware configuration in a case where the failure diagnosis apparatus 3 is configured by means of software with using a CPU and a memory. That is, the failure diagnosis apparatus 3 is implemented by means of software with using functions of a computer (electrical computer) such as a personal computer.

A program preferable for implementing the failure diagnosis method and the failure diagnosis apparatus according to the embodiments of the invention to which the Bayesian network described later are applied, by means of software with using an electrical computer or a computer-readable storage medium storing, may be extracted as an invention.

As a matter of course, the failure diagnosis apparatus 3 and the failure diagnosis section 200 are not limited to such a configuration using a computer. The failure diagnosis apparatus 3 and the failure diagnosis section 200 may be configured by means of a combination of exclusive hardware that performs the functions of the functional sections shown in FIG. 5 to FIG. 9. Employment of a mechanism in which software executes processings provides an advantage in that the processing procedures can be easily changed without changing the hardware.

In order to make an electrical computer perform the failure diagnosis function using a series of the Bayesian network processings by means of software, a program forming the software is installed from a recording medium into a computer (installed microcomputer) incorporated with exclusive hardware, a SOC (System On a Chip) realizing a desired system by mounting the functions of a CPU (Central Processing Unit), a logic circuit, and a storage device on one chip, or a general-purpose personal computer, which can execute various functions by installing various programs therein.

The recording medium can transmit description contents of a program to a reading device set in hardware resources of a computer in a form of corresponding signals by causing changed states of energy such as magnetism, light, and electricity according to the description details of the program.

For example, the recording medium consists of, separately from the computer, not only a magnetic disk (including a flexible disk FD), an optical disk (including CD-ROM (Compact Disc Read-Only Memory), DVD (Digital Versatile Disc), a magnetic optical disk (including MD (Mini Disc)), or a package medium (portable recording medium) consisting of a semiconductor memory in which a program has been recorded, distributed for providing the program to customers, but also a ROM or a hard disk drive in which a program is recorded and is distributed in a pre-installed condition in the computer. Or, the program making the software may be distributed through a wired or wireless communications network.

For example, a storage medium in which program codes of software for implementing the calculation (including updating) function of failure probabilities in the Bayesian network processing is supplied to a system or a device. A computer (or CPU or MPU) of the system or the device reads the stored program codes. As a result, the same effect as in the case of configuration by hardware is also provided. In this case, the program codes themselves readout from the storage medium realize the failure diagnosis processing function using the Bayesian network.

Furthermore, by executing the program codes readout by the computer, not only the function for executing the Bayesian network is implemented, but also the OS (operating system: base software) working on the computer on the basis of instructions of the program codes may execute a part or the whole of the actual processing. By such processing, the failure probability calculation processing function and the failure point judgment processing function are implemented.

Furthermore, after the program codes readout from the storage medium is written onto a function expanding card inserted into the computer or a memory equipped in a function expanding unit connected to the computer, a CPU of the function expanding card or the function expanding unit may execute a part or the whole of actual processing on the basis of the instructions of the program codes. By such processing, the failure probability calculation processing function and the failure point judgment processing function are implemented.

In a case where the failure diagnosis apparatus 3 is installed in the image forming apparatus 1 having a copying function, installed into the electrical computer shown in FIG. 8 are software similar to that in a conventional image forming apparatus (complex machine) such as a processing program for a copying application, a printer application, a facsimile (FAX) application or other applications. In addition, a control program for data exchange with the exterior via the network 9 is also installed.

In this case, a program is provided as a file describing program codes for implementing the failure probability calculation processing function and the failure point judgment processing function by using the Bayesian network. However, in this case, form of providing the program is not limited to a lump program file. The program may be provided as individual program modules according to the system hardware configuration in the computer. For example, the program may be provided as add-in software installed in the existing copying machine control software or printer control software (printer driver).

For example, the computer system 900 forming the failure diagnosis apparatus 3 has a controller section 901, and a recording and reading control section 902 for reading data from or recording data onto a predetermined storage medium such as a hard disk drive, a flexible disk (FD) drive, a CD-ROM (Compact Disk ROM) drive, and a semiconductor memory controller.

The controller section 901 has a CPU (Central Processing Unit) 912, a ROM (Read Only Memory) 913 as a read-only storage section, a RAM (Random Access Memory) 915 that can be written or readout any time and is an example of a volatile storage section, and a RAM (referred to as NVRAM) 916, which is one example of a nonvolatile storage section. Information of parts failure probabilities weighted by used time, frequency, copied/printed sheet number is stored in the NVRAM 916.

In the above description, "volatile storage section" means a storage part which erases stored contents when the power source of the failure diagnosis apparatus 3 is turned off. On the other hand, the "nonvolatile storage section" means a storage part which continuously holds the stored contents even after the main power source of the failure diagnosis apparatus 3 is turned off. Any storage part can be used as long as it continuously holds stored contents, and the storage part is not limited to a semiconductor-made memory device which has nonvolatility by itself, and the storage part may be formed by constructing a volatile memory device so as to have "nonvolatility" by being provided with a backup battery. Furthermore, not limited to consisting of a semiconductor-made memory device, the storage part may be constructed by using a medium such as a magnetic disk or an optical disk.

Furthermore, the computer system 900 has, as functional section serving as a customer interface, an instruction input section 903 including a keyboard and a mouse, a display output section 904 for displaying an operation guidance screen or predetermined information such as results of processing to a customer, and an interface section (IF section) 909 performing an interface function between itself and the respective functional sections. When the failure diagnosis apparatus 3 is installed into an image forming apparatus 1 having a copying function and integrated together, an image reading section (scanner unit) 905 for reading an image as a processing object and an image forming section 906 for outputting a processed image to a predetermined output medium (for example, a printing sheet) are also provided.

In addition to a system bus 991, which is a transfer route for processed data (including image data) and control data, for example, a scanner IF section 995 performing an interface function for the image reading section 905, a printer IF section 996 performing an interface function for the image forming section 906 and other printers, and a communications IF section 999 for mediating exchange of communications data with the network 9 such as the Internet are provided as the interface section 909.

The display device 904 comprises, for example, a display control section 942, and a display section 944 consisting of a CRT (Cathode Ray Tube) or an LCD (Liquid Crystal Display). For example, the display control section 942 displays guidance information or a whole image taken by the image reading section 905 on the display section 944. Furthermore, it is also used as a display device for informing a customer of the results of failure judgment or inspection details. Furthermore, when the display section 944 has a touch panel 932 on the display surface, the touch panel 932 configures the instruction input section 903 for inputting predetermined information by fingertips or a pen.

The image reading section 905 has a function of an image input terminal, and for example, by irradiating light onto a document fed to a reading position by using a full-width array of a CCD solid-state image pickup device, an image on a document is read and red R, green G, and blue B analog video signals showing the read image are converted into digital signals.

The image forming section 906 forms (prints) a visible image of, for example, an image expressed by image signals obtained by the image reading section 905 onto a regular sheet or a thermal sheet by using electrophotography, the thermal method, the heat transfer method, the ink-jetting method, or similar conventional image forming processing.

Therefore, the image forming section 906 has an image processing section 962 for generating print-out data such as yellow Y, magenta M, cyan C, and black K binarized signals, and a print engine 964 of a luster output scanning base for working the failure diagnosis apparatus 3 as a digital printing system.

In this configuration, the CPU 912 controls the whole system via the system bus 991. The ROM 913 stores the control program of the CPU 912. The RAM 915 has a SRAM (Static Random Access Memory), and stores program control variables and data for various processing. The RAM 915 includes a region for temporarily storing electrical documents (including not only text data but also image data) acquired by a predetermined application program, image data acquired by the image reading section 905 equipped in this unit, and electrical data acquired from the exterior.

For example, the program for making the computer performing the failure probability calculation processing function and the failure diagnosis processing function by using the Bayesian network is distributed through a recording medium such as a CD-ROM. Alternatively, this program may be stored not in a CD-ROM but in an FD. It is also possible that a MO drive is provided and the program is stored in the MO, or the program may be stored in a nonvolatile semiconductor memory card such as a flash memory, or other recording media. Furthermore, the program may be downloaded or updated from other servers through the network 9 such as the Internet.

As a recording medium for providing the program, in addition to the FD and the CD-ROM, optical recording media such as a DVD, magnetic recording media such as an MD, optical magnetic recording media such as a PD, tape media, magnetic recording media, semiconductor memories such as IC cards or miniature cards can be used. In an FD or CD-ROM as an example of the recording medium, apart or whole of the functions for realizing the failure probability calculation processing function and the failure diagnosis processing function by using the Bayesian network can be stored.

Furthermore, the hard disk drive includes a region for storing data for various processing by the control program or temporarily storing a large amount of image data acquired by the image reading section 905 and printing data acquired from the exterior. The hard disk drive, the FD drive, or the CD-ROM drive is used for registering program data for making the CPU 912 to execute processing such as contents acquisition, address acquisition, or address setting on software.

Furthermore, a processing circuit 908 which performs processing of a part of the functional sections by exclusive hardware, rather than performing all processing of the functional sections of the failure diagnosis apparatus 3 by means of software, may be provided. The mechanism for processing by software can flexibly cope with parallel and serial processing, however, as the processing becomes complicated, the processing period is lengthened, so that lowering in processing speed poses a problem. On the other hand, by processing with a hardware processing circuit, an accelerator system aiming at an increase in speed can be constructed. The accelerator system can prevent lowering in processing speed and obtains high throughput even when the processing is complicated.

In the case of the failure diagnosis apparatus 3 of this embodiment applied to the image forming apparatus 1, a data acquisition functional section 908a of a sensor system for acquiring observation data information (ND120) such as the sheet passing times, drive currents, vibrations, operation sounds, and light amounts shown in FIG. 4, environment information (ND140) such as the temperature and the humidity, observation data information (ND180) relating to an output image, or observation data information (ND 190) relating to an image transfer system corresponds to the processing circuit 908.

<<Details of the Failure Diagnosis Using the Bayesian Network>>

Figure 9:
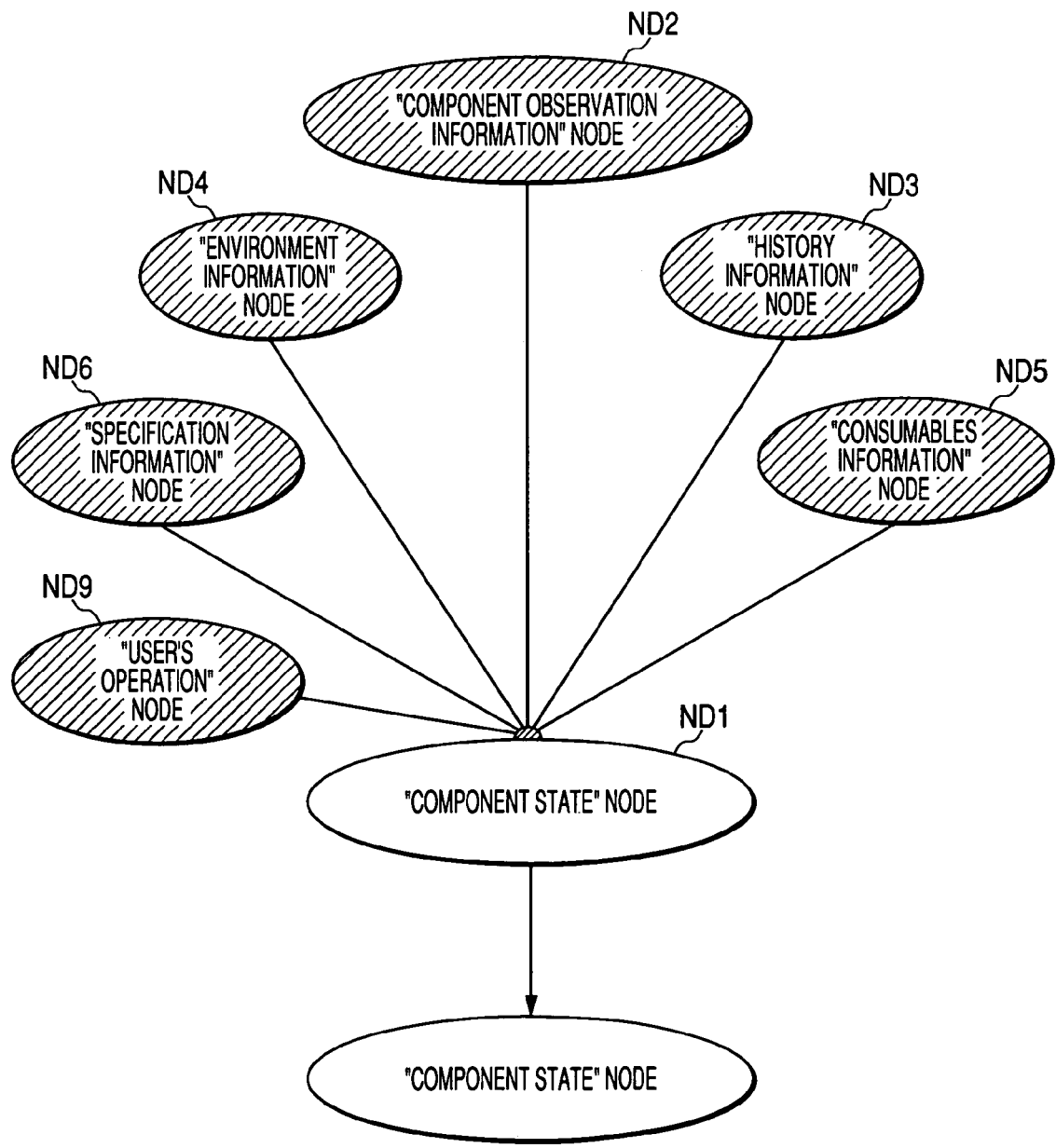
FIG. 9 is Bayesian network model diagram showing a basic construction example of the Bayesian network used for failure diagnosis in the failure diagnosis section.

FIG. 9 is the Bayesian network model diagram showing a basic configuration example of the Bayesian network used in the failure diagnosis performed in the failure diagnosis section 500.

The Bayesian network is a directed acyclic graph showing causal relationships among variables. When a parent is provided, the Bayesian network associates conditional probability distribution with the variables. The Bayesian network models an area in question using the probability theory. Assuming that other related information is given, information regarding a variable sub set is provided with using the Bayesian network expression in question.

The Bayesian network has a set of variables (nodes: expressed by ellipses) and a set of arcs (indicated by arrows) representing directed edges (connections among the variables). The arrows called as arcs represent causal relationships, and are connected from causes to results in the directions of the arrows.

Each of the nodes (variables) has sets exclusive from each other. A probability of occurrence from a cause to a result (conditional probability table) is set in each node in advance. The nodes form a directed acyclic graph (DAG) in conjunction with directed edges. Conditional probability tables P($v$| $w1, \ldots, wn$) are defined for the respective variables $v$ having parents $w1, \ldots, wn$. When $v$ has no parent, this table decreases to a marginal probability P($v$).

To a node having no arrow to enter thereinto, only an event probability of the node is set. The great feature of the Bayesian network is in that a probability of a states that cannot be directly observed (for example, occurrence of a failure) is estimated from information that can directly observed (or acquired), and that the probability (whether or not a failure occurs) of the directly unobservable states can be calculated.

Namely, in order to express an area in question including complicated causal relationships, the Bayesian network successively links causal relationships among a plurality of variables to express the area in question as a network having a graph structure. In the Bayesian network, dependency relationships among designed variables are expressed by a directed graph. Then, the Bayesian network provides a graph structure having characteristics that a set of variables form nodes of the network, that a set of links or arrows connect node pairs; and that intuitive meaning of an arrow from node X to node Y is that X directly influences Y (Y depends on X). The graph is a directed acyclic graph having no cycle in the arrow directions.

In FIG. 9, a hatched node is a directly observable node. When calculating the probability of a node shown without hatching, the state of a component (possibility of failure) can be found. For example, Bayes' theorem is used in probability calculation of each node. However, in a network configuration having a large number of nodes and a loop, calculation is substantially impossible since the calculation amount is enormous. Therefore, efficient various calculation algorithms has been invented for accurately updating probabilities in the Bayesian network. Some pieces of calculation software are distributed from manufacturers.

The Bayesian network shown in FIG. 9 corresponds to FIG. 6. Namely, for example, as shown in FIG. 9, the Bayesian network of this embodiment is configured so that the component observation information node (environment node) ND2 indicating environmental conditions, the history information node ND3, the environment information node ND4, the consumables information node ND5, the specification information node ND6, and the user's operation node ND6 surround the component state node ND1 on the basis of their causal relationships.

The component state node ND1 is a node indicating a component state. The probability of this node is calculated to judge whether or not a failure has occurred. In each node, a probability table summarizing probability data indicating level of the causal relationship is set in advance. Past data or part MTBF (Mean Time Between Failures) may be used as an initial value of the probability data. When value is excessively small, values that are relative among parts may be used so that the levels of the failure probabilities are clear.

The observation information node ND2 is information automatically acquired by using sensor members inside the image forming apparatus 1 and used for judgment of failure diagnosis. The observation information node ND2 includes a component observation information node, an observation data node relating to an output image, and/or an observation data node of the image transfer system. Herein, the component observation information node represents the sheet conveyance time information, the drive current information, and/or the vibration information in this embodiment. The observation data node relating to the output image represents information on shape, size, density, contour, orientation, position, periodicity, and occurring region of a defect. The observation data node of the image transfer system represents information on component temperatures, applied voltages, patch densities, and/or a remaining amount of coloring material (for example, toner).

The history information node ND3 indicates the use state of the image forming apparatus 1. In this embodiment, the history information node ND 3 is history information on the fed number. As described in FIG. 6, the fed number is information indicating how many sheets the feed section has fed after installation of the image forming apparatus 1 at a predetermined position or after component replacement. The fed number directly influences wearing of rolls, wearing of gears, and wearing of bearings of motors, and influences the states of components.

The environment information node ND4 relates to surrounding environment conditions that influence the states of components. In this embodiment, the environment information node ND4 is temperature and humidity. As described in FIG. 6, temperature and humidity influence coefficient of friction between a feed roll and a sheet and coefficient of friction between sheets, and influences sheet conveyance time.

The consumables information node ND5 is information on consumables used in the image forming apparatus 1, such as sheet thickness, sheet type, color of coloring material, type of the coloring material, and remaining amounts of the coloring material. For example, depending on sheet type and sheet thickness, friction between a roll and a sheet and friction between sheets change, and influences from the surrounding temperature and humidity also change. Likewise, if an appropriate coloring material is not used, this influences image formation. Namely, specifications of consumables influence failure diagnosis.

The specification information node ND6 is information including destination and special parts. For example, in a device for use in cold regions or for use in coastal regions, members suitable for cold regions or coastal regions are used. When failure diagnosis is executed for a device in which a part suitable for destination is used, if judgment is made without considering the original part specifications, correct judgment cannot be made even in a case where the failure probability calculated for such a part is the same. Namely, product specifications and parts specifications based on the product specifications influence failure diagnosis.

The user's operation node (ND9) represents information for making the image forming apparatus 1 execute the same processing with changing the operation condition, and includes information on an operation condition after changed.

Figure 10:
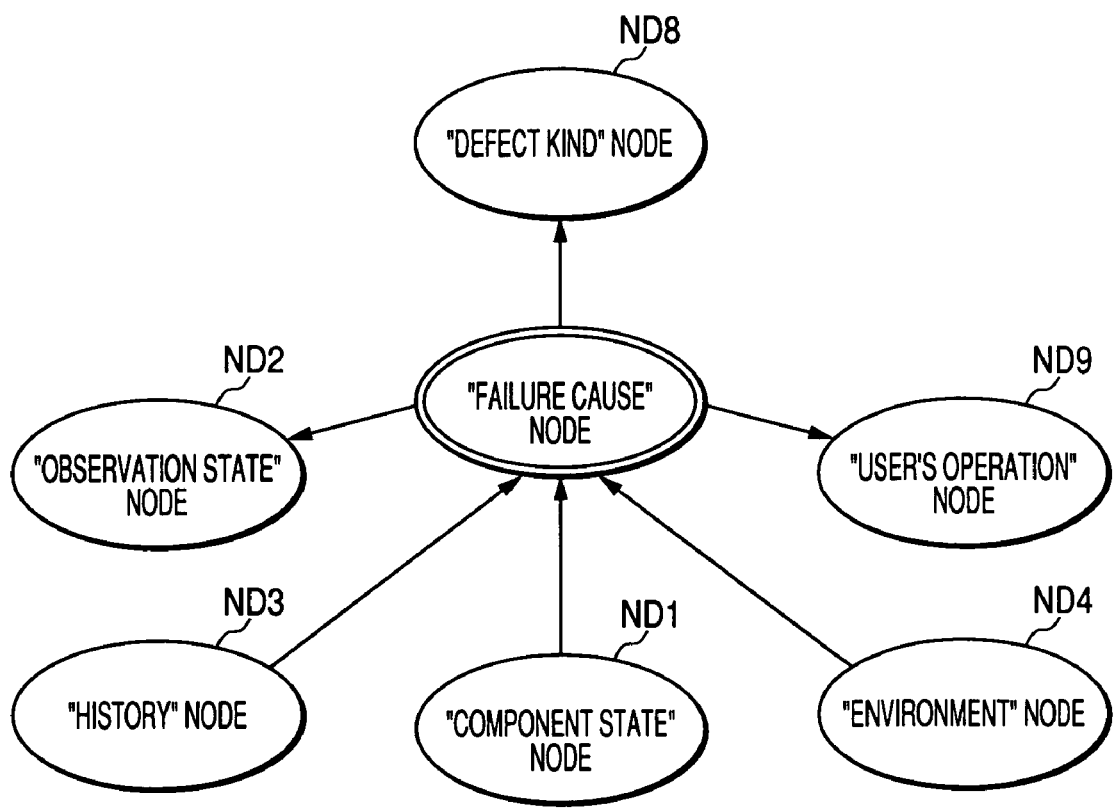
FIG. 10 is a diagram showing a construction example of the Bayesian network in the case where a failure diagnosis for specifying a failure point of an image quality defect system is executed.

FIG. 10 shows a more detailed construction example of the Bayesian network, which shows an example of Bayesian network construction in the case where a failure diagnosis for specifying a failure point of the image quality defect system is executed. As illustrated, this Bayesian network has a component state node ND1 indicating state information of components forming the image forming apparatus 1, a history information node ND3 indicating history information of the image forming apparatus 1, an environment information node ND4 indicating surrounding environment information of a site where the image forming apparatus is installed, an observation state node ND8 indicating image defect state information, and a user's operation node ND9 indicating additional test result information obtained by user's operation.

The nodes are connected so as to satisfy the relationship of "cause"→"result." For example, the "failure cause node" and the "observation state node ND2" have a relationship therebetween such that the "failure cause" is a cause and "observation state (low density, stripe, or beltlike, etc.) results therefrom. On the other hand, the "history information node ND3" and the "failure cause node" have a relationship therebetween such that the "state based on history information (a large number of sheets having been copied or a large number of years in service, etc.,) is a cause and the "failure cause" (part deterioration, etc.,) result therefrom.

<<Processing Procedures of Operations of Entire Failure Diagnosis Apparatus>>

Figure 11:
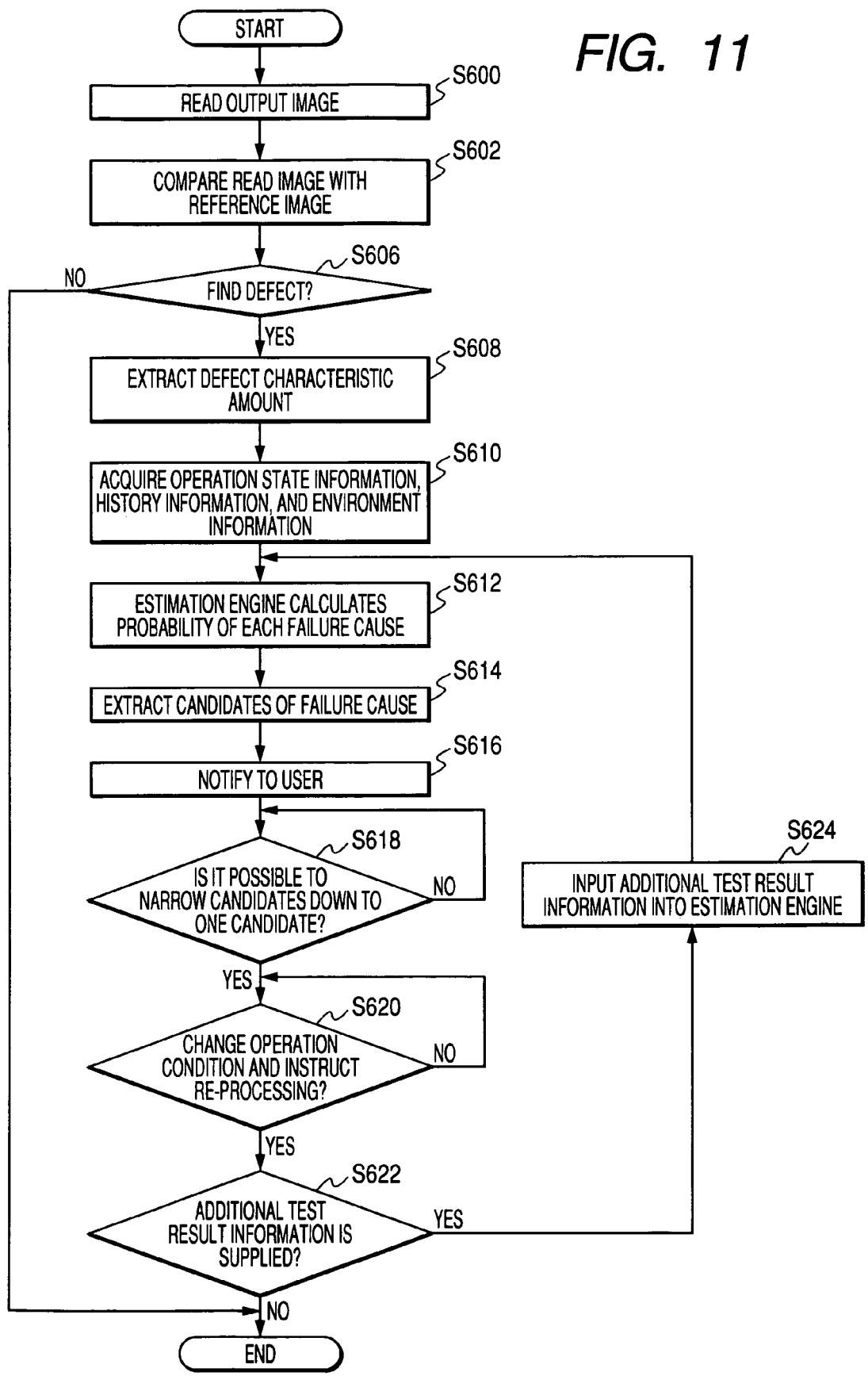
FIG. 11 is a flowchart showing the overall outline of the processing procedures of a failure diagnosis concerning an image defect by using the Bayesian network at the failure diagnosis section shown in FIG. 7.
Figure 12:
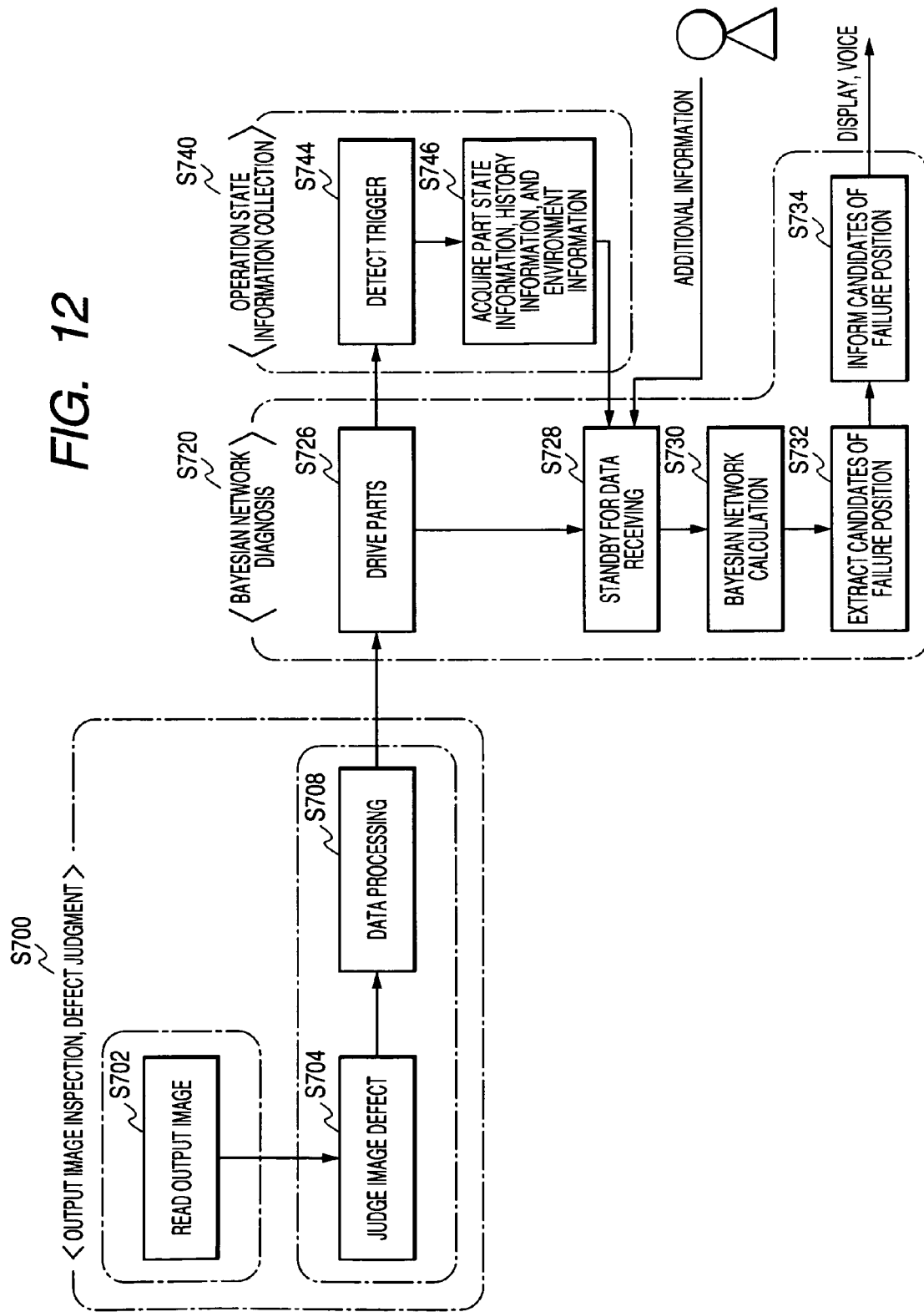
FIG. 12 is a chart showing processing procedures for specifying a failure point by using the Bayesian network when an image defect occurs, on a block diagram level.

FIG. 11 is a flowchart showing the overall outline of the processing procedures of a failure diagnosis for an image defect by using the Bayesian network in the failure diagnosis section 500 shown in FIG. 7. FIG. 12 is a chart showing on a block diagram level the processing procedures for specifying a failure point by using the Bayesian network when an image failure occurs.

In the image forming apparatus 1, when an image is formed on a printing sheet and the sheet is ejected to the outside of the image forming apparatus 1, the image reading section 100 of the image inspection device 5 reads the output image (S600, S702). Furthermore, as described before, the image may be automatically read by using an area sensor or a line sensor near the discharge tray 71 when the sheet is output onto the discharge tray 71. Alternatively, in the configuration shown in FIG. 1, the output image is read by using a line sensor 616, which has a length corresponding to the sheet width and is disposed between the fixing roller 45 and the discharge tray 71. Or, a user may utilize the image reading section 700 of the image forming apparatus 1 or another scanner as a reading device and place the output sheet on the reading device to read it in a manual manner.

The defect abnormality detection processing section 234 of the image inspection processing section 200 compares the read image with the reference image to detect an image quality defect (S602). When the defect abnormality detection processing section 234 finds an image defect (S606-YES, S704), the characteristic amount extraction section 502 processes the image data to analyze the detected defect state (S706).

For example, the characteristic amount extraction section 502 sets a proper density threshold and binarizes a result of difference, to thereby specify a black point. Or, the characteristic amount extraction section 502 extracts characteristic amounts representing the image defect state, such as unevenness of the entire density, density shifting, defect form, size, density, contour condition, orientation, position, periodicity, and occurring region (S608).

<Failure Point Specification Processing>

Next, the failure diagnosis section 500 starts processing for specifying a failure point by using the Bayesian network (S720). For example, the failure judgment section 540 activates the operation state information acquisition processing and acquires operation state characteristic amounts in conjunction with the characteristic amount extraction section 502 (S740). For example, the drum motors, solenoids, and clutches, which drive the photoconductive drum rolls 32 and serve as drive members of the image transfer system, are driven in order so that they are driven singly as a diagnosis target drive member. The failure judgment section 540 waits until the characteristic amount extraction section 502 fetches data representing operation state such as currents and vibrations (S728).

When the driving section side of the image transfer system detects a drive trigger signal (S744), the drive section side collects operation state data including currents and vibrations of the drive members inside the inspection target block in a single operation state (S746) and transmits the collected operation state data to the characteristic amount extraction section 502.

The characteristic amount extraction section 502 performs data processing by using the equation (3) on the basis of the collected operation state data, calculates characteristic amounts Vn necessary for failure judgment in an actual operation state, and transmits the calculated characteristic amounts as actual operation characteristic amount Vf to the failure judgment section 540. Real operation state data including the collected currents and vibrations may be transmitted as the actual operation characteristic amount Vf to the failure judgment section 540.

$$V_n - \sum_{k=1}^{n} (vk)^2 \qquad \text{[Equation 3]}$$

Furthermore, the characteristic amount extraction section 502 acquires not only the information on the drive members, but also various data necessary for other failure diagnoses using the Bayesian network, such as temperatures of a specific part and another state information concerning the specific part, environmental data including temperatures and humidities inside the image forming apparatus 1 in an operation state, history information, and specifications of the image forming apparatus 1 (S610).

When the failure judgment section 540 receives data (analysis results of the defect state, the actual operation characteristic amounts Vn in the actual operation state or real operation state data) from the characteristic amount extraction section 502, the failure judgment section 540 extracts candidates of a failure point (candidates of a failure cause) in conjunction with the estimation engine 560 by using the Bayesian network (S612), and notifies the notification section 270 of the results of extraction.

For example, the failure judgment section 540 transmits data (the analysis result of the defect state, the actual operation characteristic amounts Vn i, or real operation state data) from the characteristic amount extraction section 502 to the estimation engine 560. The estimation engine 560 calculates failure probabilities on the basis of the data received, that is, starts Bayesian network calculation processing (S730).

The estimation engine 560 extracts candidates of a failure point (candidates of a failure cause) where failure concerning image quality occurs, on the basis of the calculated failure probabilities (S732). The estimation engine 560 notifies the failure state specifying section 248 of the extraction results. At this time, the estimation engine 560 adjusts the failure probabilities to be calculated with considering the distribution of various measurement data shown by the actual operation characteristic amount (average values, center values, and standard deviations and dispersions σ). Likewise, even in normal conditions, the estimation engine 560 adjusts the failure probabilities to be calculated with considering the distributions of various measurement data shown by the reference characteristic amounts. Then, based on degrees of deviation of the failure probabilities based on operation state signals measured in the actual operation states from normal ranges, or based on whether or not an abnormal output that should not exist originally, failure candidate point judgment is made.

For example, although averages and center values (medians) of the measurement data are equal, if they vary greatly, the failure probability is set to be high. This is effective for judgment in a failure mode with characteristics that greatly vary in the case of failure, such as the image density and sharpness, etc.

Furthermore, when the degrees of variation of the measurement data are equivalent and averages of the measurement data are within a predetermined range, the failure probabilities for both cases are set equal. In the case of measurement data having fluctuations in numerical values themselves, which involve no failure, erroneous judgment can be avoided without widening the judgment tolerance. Since the judgment tolerance does not need to be widened, judgment accuracy hardly lowers.

The failure state specifying section 248 notifies a customer of the candidates of the failure point extracted by the estimation engine 560 through the notification section 270, by a multimedia device such as a display device or a voice device (S616, S734). When the candidates of the failure point are narrowed to one, the processing is completed (S618-YES).

However, in such an automatic judgment processing, it is not always possible to extract a single candidate of the failure point. When the candidates of the failure point cannot be narrowed to one (S618-NO), the process waits for an instruction of re-processing, which involves change of the operation condition (S620-NO). When a user confirms that the candidates of the failure point could not be narrowed to one upon receiving the failure diagnosis results through the notification section 270, the user changes the operation condition, and instructs re-outputting and diagnosis processing.

Upon receiving a user's instruction responsive to the notification of the failure diagnosis results through the notification section 270, the characteristic amount extraction section 502 of the failure diagnosis section 500 changes the previous operation state to different one and acquires additional test result information (S622-YES) such as observation data information of the conveyance system (ND120), output image related observation data information (ND180), or observation data information of the image transfer system (ND190) in a similar manner. Then, the characteristic amount extraction section 502 transmits characteristic amounts extracted from the additional test result information to the estimation engine 560 (S624).

Hereinafter, the estimation engine 560 and the failure judgment section 540 calculates failure probabilities in the same manner as described above in conjunction with each other based on information after the operation condition is changed, extracts candidates of a failure point candidate (candidates of a failure cause) on the basis of the calculated failure probabilities (S732), and notifies the failure state specifying section 248 of the results of extraction. In this case, result information for the user's operation is added, failure probability are calculated, and the candidates of the failure point are narrowed on a basis of the calculation result.

In a case where it is hard to narrow the candidates of the failure point to one, when no special instruction is given by a user or an instruction of suspension of the processing is given by a user within a predetermined period of time, the processing is terminated without acquiring the additional test result information (S622-NO).

DETAILED EXAMPLE OF FAILURE
DIAGNOSIS METHOD

Figure 13:
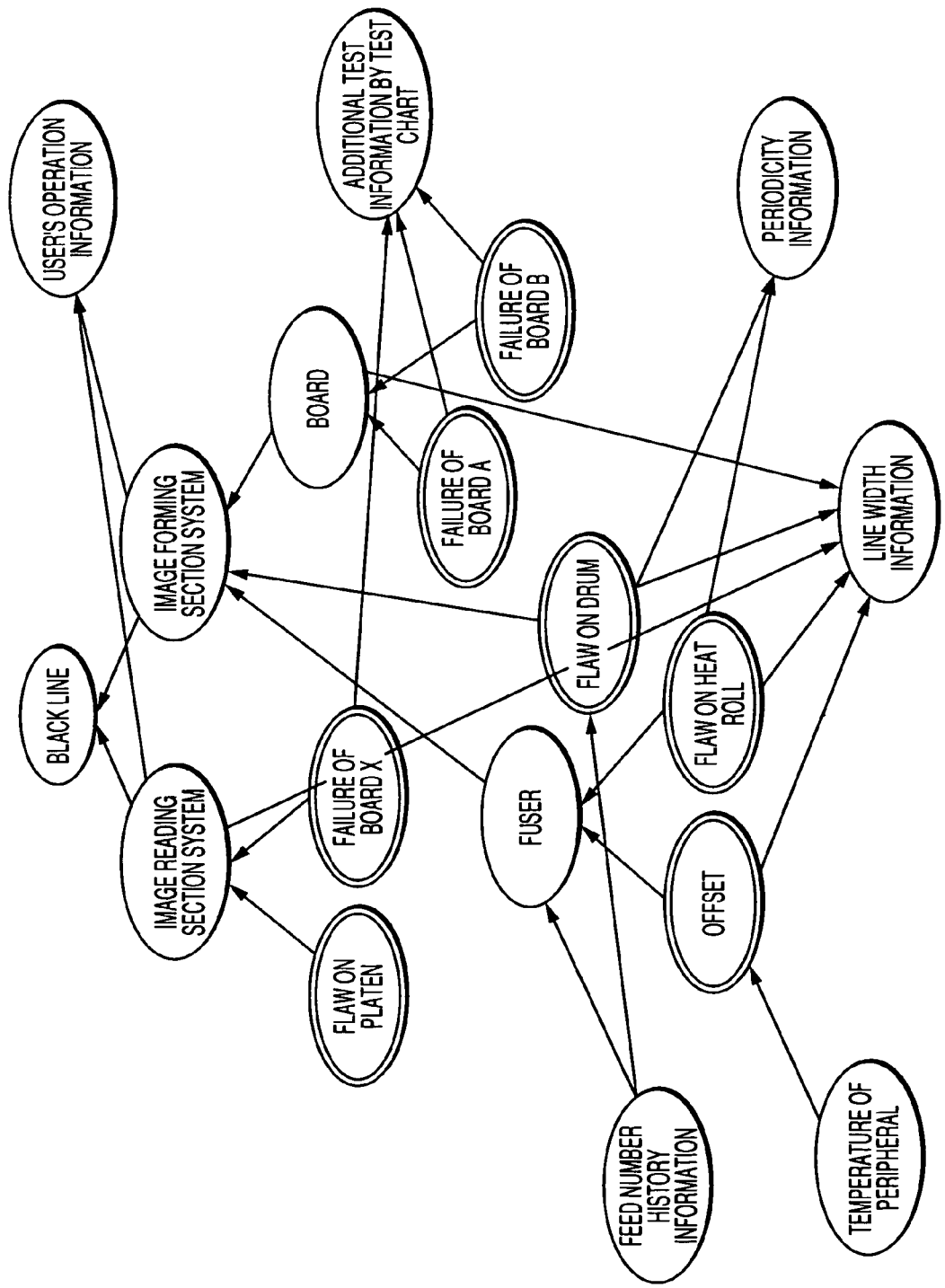
FIG. 13 is a diagram showing an example of Bayesian network when a black line appears.

FIG. 13 is an explanatory view of a detailed example of operations of the failure diagnosis apparatus 3 configured as described above, and shows an example of the Bayesian network for a case where a black line appears, of the construction examples of the image defect failure diagnosis. As illustrated, nodes are connected so as to satisfy the relationship of "cause" to "result." For example, "a flaw on a drum" and the "line width information" have such a relationship therebetween that "a flaw on a drum" is a cause and "line width information" results therefrom.

On the other hand, the "feed number history information" and the "fuser" have such a relationship therebetween that a state based on the "feed number" (feed number is equal to or larger than certain number) is a cause and the possibility of black line appearing due to "fuser" deterioration is increased by the cause.

The initial values of the probability data of the respective nodes are determined on the basis of, for example, past data. Thereafter, on the basis of statistical data on market troubles such as parts replacement frequency and failure frequency, the probabilities of the nodes may be periodically updated.

The processing procedures shown in FIG. 11 and FIG. 12 are also effective for specifying whether failure of a black line was caused by "a flaw on the photoconductive drum roll 32" or "deterioration of the pair of fixing rolls (fusers) 74" in the case of executing a failure diagnosis by automatically collecting internal state information, history information, and surrounding environment information of the image forming apparatus 1 on the basis of, for example, image defect detection and characteristic amounts thereof. Furthermore, the processing procedures shown in FIG. 11 and FIG. 12 are also effective for specifying a failure cause point of a black line on the basis of a place where the black line appeared.

For example, a black line results from not only the image output section side such as the "flaw on the photoconductive drum roll 32" or "deterioration of the fixing rollers 45," but also the image reading section side such as a flaw on the platen glass. In some cases, it is difficult to specify the failure cause only by automatic diagnosis.

In such a case, in accordance with the processing procedures shown in FIG. 11 and FIG. 12, the failure diagnosis section 3 receives results of processing, which is performed with changing the output conditions, e.g., changing the orientation of the document or the printing sheet, acquires additional information responsive to customer's operations, re-calculates failure probabilities, and judges location dependency of occurrence of black line (that is, block dependency). As a result, the failure diagnosis section 3 can specify the failure point, that is, whether the failure point is on the image reading section side or the image output section side.

Of course, the embodiment is not limited to division of the mechanical system into the drive mechanical section system and the image reading section side/the image output section side. It is also possible to divide the image forming apparatus 1 into the image processing (pure electrical) system and the mechanical system.

Furthermore, for example, test patterns stored in substrates may be output in order and information as to which of the test patterns of substrates a black line has occurred may be acquired as additional information responsive to a customer's operation, whereby failure points can be narrowed.

As described above, according to the failure diagnosis processing of the failure diagnosis apparatus 3 described in this embodiment, when a defect is detected in an image formed in a predetermined operation condition, based on component statuses, machine history, environment information, etc., in the operation states in the operation condition, failure probabilities are calculated by using the Bayesian network, and on the basis of the calculated failure probabilities, candidates of a failure point are extracted. If it is hard to narrow the candidates of the failure point to one, result information further obtained by a user's operations is added and failure probabilities are re-calculated, and a failure candidate is narrowed on a basis of the re-calculation result.

Provided is means for automatically collecting information on components (members) with using a sensor at a time when specifying a failure point that is a cause of occurrence of an image abnormality. A device automatically determines failure probabilities of a part with utilizing the Bayesian network on a basis of the collected information and characteristic mounts (in the previous embodiment, the information concerning the distribution) extracted from the collected information. Then, the device specifies a failure cause point. As a result, when performing failure diagnosis, it is not required to have preliminary knowledge or experience, so that it is possible to execute accurate, uniform, and quick failure diagnosis without depending on the skill of a maintenance servicer. Variation involved in the case of using user's inputs does not occur. Action such as user inputs becomes unnecessary. Therefore, a convenient mechanism, which does not give a user stress, can be constructed.

Furthermore, even when it is difficult to specify a failure cause only by automatic diagnosis, failure probabilities are re-calculated by inputting additional information by user operations, so that even a serviceman who is inexperienced can perform more accurate diagnosis by easy operations.

In addition, not only information on components (members) but also internal status information such as the temperature and humidity of the unit, history information, and surrounding environment information are automatically acquired, and based on the characteristic amounts thereof, parts failure probabilities are determined by using Bayesian network and a failed part is specified, whereby more accurate failure diagnosis becomes possible.

For example, by installing a program for automatically collecting various data necessary for troubleshooting (herein, failure diagnosis) as an automatic troubleshooting mechanism, the diagnosis speed can be increased. This does not require interactive collection of data from a customer, so that a convenient diagnosis system that does not trouble a customer can be realized.

Furthermore, a customer is informed of the results of inspection, so that quick responding notification becomes possible, whereby downtime can be significantly reduced.

Thus, by the failure diagnosis apparatus 3 of this embodiment, it becomes possible to execute accurate, uniform, and quick failure diagnosis of various failure states or possibilities of failures of various members without requiring preliminary knowledge, experience, or skill of a maintenance servicer.

Figure 14:
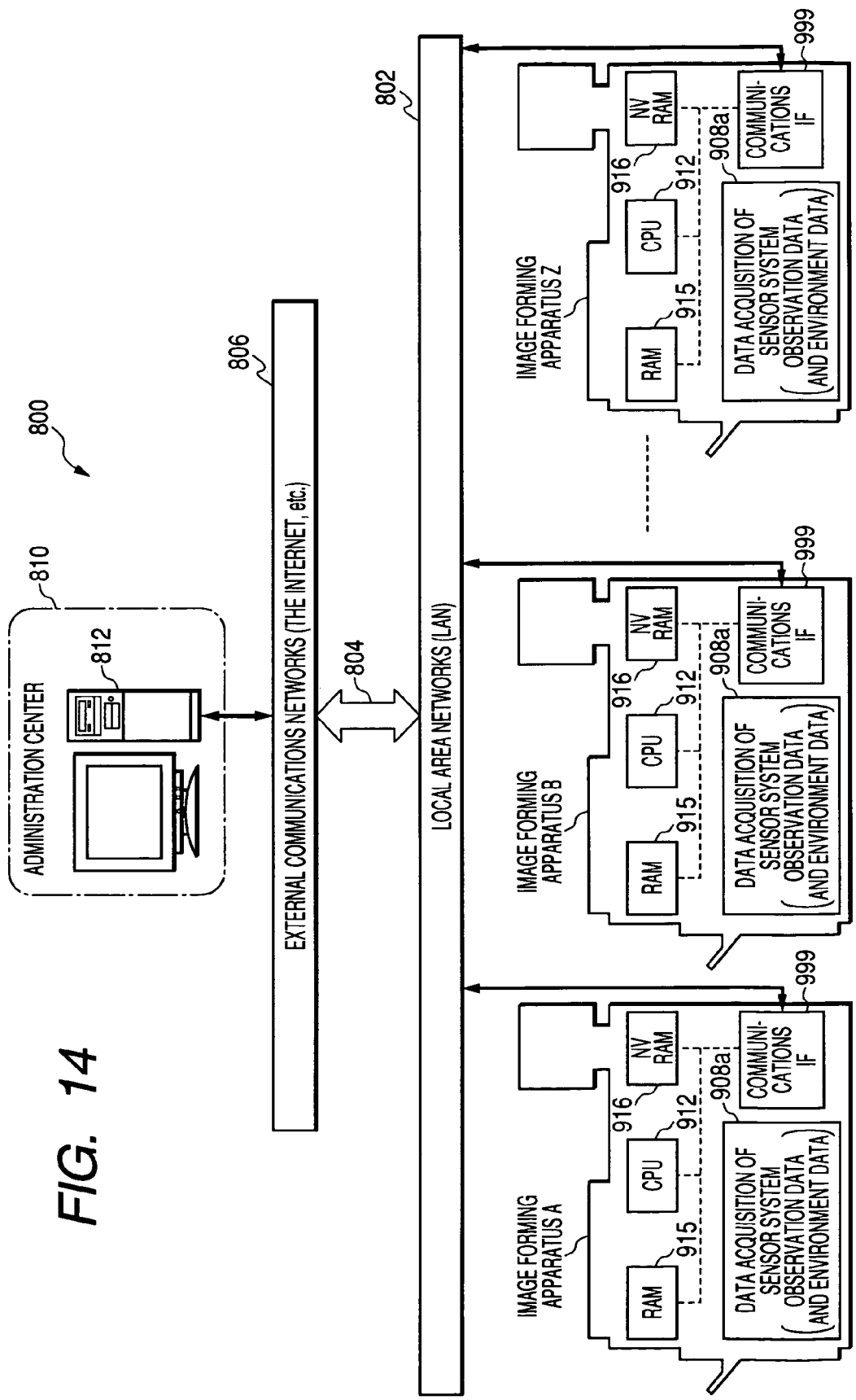
FIG. 14 is a diagram showing a construction example of the failure diagnosis system which executes a failure diagnosis at an administration center connected to the image forming apparatus via a communications line.

FIG. 14 is a diagram showing a construction example of the failure diagnosis system constructed so as to execute a failure diagnosis at an administration center connected to the image forming apparatus 1 via a communications line.

In the illustrated failure diagnosis system 800, a plurality of image forming apparatuses 1 (A, B . . . Z) constructed so as to operate by software processing by using a memory such as the CPU 912, the RAM 915, or the NVRAM 916 as shown in FIG. 8 are connected to a local area networks (LAN) 802. The local area networks 802 is further connected to an external communications networks 806 such as the Internet via a communications networks 804.

Each of the image forming apparatuses 1 (A, B . . . Z) is provided with the data acquisition functional section 908a of the sensor system for acquiring observation data information such as the sheet passing times, drive currents, vibrations, operation sounds, or light amounts (ND120), environment information such as the temperatures and humidities (ND140), output image related observation data information (ND180), or observation data information of the image transfer system (ND190), and is constructed so that the measurement data is notified to the exterior through the communications IF999 and the local area networks 802.

At the administration center 10, a host computer 812 is provided, and communication processing can be performed between the same and the image forming apparatuses (A, B . . . Z) via the external communications networks 806, the communications line 804, and the LAN 802.

In the host computer 812, except for the data acquisition functional sections 908a in the failure diagnosis apparatus 3 described in the above-mentioned embodiment, an application program for realizing data processing functional sections including characteristic amount acquisition functional sections, failure judging functional sections, and estimation engine functional sections relating to failure diagnosis by means of software processing is installed. For example, the characteristic amount acquisition functional sections as data receiving functional sections are the characteristic amount acquisition section 502, the sheet passing time characteristic amount acquisition section 220, and the control section 250 shown in FIG. 7. The data processing functional sections are, for example, the failure judgment section 540, the estimation engine 560, and the notification section 570 shown in FIG. 7.

With such a construction, the failure diagnosis system 800 becomes a system constructed by providing the failure judgment section 540 and the estimation engine 560, etc., at the administration center 810 outside the unit by using communications lines such as the Internet and the LAN 802, wherein failure diagnosis for the image forming apparatuses 1 is executed in the host computer 812 of the administration center 810.

With this system structure, for processing for specifying a failure point that caused an image abnormality, a data acquisition functional section 908a is also provided as a means for automatically collecting the operation state information of components (members) concerning image formation by using sensors, and measurement data collected by this data acquisition functional section 908a can be transmitted to the administration center 810 via a communications networks.

Therefore, at the administration center, on the basis of characteristic amounts extracted from the measured data (information concerning distribution in the above-mentioned examples), the host computer 812 can automatically determine failure probabilities of parts and specify parts in failure by using Bayesian network. When the failure candidates could not be narrowed to one, failure probabilities are re-calculated by receiving result information by further user operations, and from the results, the failure candidates can be narrowed.

Therefore, as in the above-mentioned embodiment described in a form in which the failure diagnosis apparatus 3 is provided inside the image forming apparatus 1, preliminary knowledge and experience are not necessary for failure diagnosis, and accurate, uniform, and quick failure diagnosis without depending on the skill of a person who performs maintenance can be performed. Not only the information on components (members), but also internal status information such as the temperature and humidity of the unit, history information, and surrounding environment information are automatically collected, and on the basis of the characteristic amounts, failure probabilities of parts are determined by using Bayesian network, and parts in failure can be specified, so that more accurate failure diagnosis can be executed.

At the administration center, failure diagnosis can be executed collectively for a plurality of image forming apparatuses via the Internet, etc., so that a serviceman can check the results of diagnosis in advance, and when the serviceman goes to perform repair, he/she can quickly make a response such as preparation of necessary parts.

Furthermore, before resulting in a failure, preliminary diagnosis (example of failure prediction processing) can be performed, so that scheduled maintenance becomes possible before resulting in failure, whereby service costs can be significantly reduced. The same applies to the case where the failure diagnosis apparatus is provided inside the image forming apparatus 1, and a maintenance plan can be made by performing diagnosis without going to the unit installed location, so that the service costs can be further reduced.

The invention is described above with reference to an embodiment, however, the technical scope of the invention is not limited to the range described in the above embodiment. Various modifications and improvements of the embodiment are possible without deviating from the spirit of the invention, and modes including such modifications or improvements are also included in the technical scope of the invention.

Furthermore, the above-mentioned embodiment is not intended to limit the invention according to the claims, and all combinations of characteristics described in the embodiment are not always essential to the solution means of the invention. The above-mentioned embodiments include inventions of various steps, and various inventions can be extracted by appropriate combinations of a plurality of constituent features disclosed. Even if several constituent features are deleted from all constituent features shown in the embodiments, a construction from which the several constituent features are deleted can be extracted as an invention as long as the effects are obtained.

For example, FIG. 11 and FIG. 12 describe an example in which when an image defect occurs and a failure diagnosis for specifying a failure point of an image quality defect system is executed by using Bayesian network, in the case where it is difficult to specify the failure cause only by automatic diagnosis, additional information is input by user operations and failure probabilities are re-calculated on the basis of the information in a changed operation condition, however, the applicable scope is not limited to this example.

For example, in failure diagnosis for specifying a failure point of a mechanical system (sheet conveyance system), when it is difficult to specify a failure cause only by automatic diagnosis, additional information is also input by user operations, and failure probabilities are re-calculated on the basis of information obtained in a changed operation condition, such as operations at a speed higher than normal or at a lower speed, whereby more accurate failure diagnosis can be executed for a failure state that becomes more conspicuous due to the changed operation speed.

Furthermore, the above-mentioned embodiment shows an example in which the failure diagnosis apparatus is applied to an image forming apparatus having a copying function, a printer function, or a facsimile function or a complex machine having the combination of these functions, however, the unit to which the failure diagnosis apparatus is applied is not limited to image forming apparatuses, and may be applied to other arbitrary units such as home appliances and automobiles, etc.

What is claimed is:

1. A failure diagnosis apparatus for diagnosing failure occurring in an image forming apparatus, the failure causing defect in an image output from the image forming apparatus, the failure diagnosis apparatus comprising:

an image inspection section that compares a captured image, which is obtained by optically reading the image output from the image forming apparatus, with a reference image for inspection to analyze a state of defect in the captured image, a failure diagnosis section that analyzes operation state signals based on the state of the defect analyzed by the image inspection section and on a failure probability model, wherein the failure probability model is obtained by modeling a cause of the failure occurring in the image forming apparatus with using probabilities, to execute failure diagnosis with respect to each of constituent members constituting the image forming apparatus, wherein:

the operation states signals are automatically acquired in the image forming apparatus during the image forming apparatus operating in different operation conditions, respectively.

2. The failure diagnosis apparatus according to claim 1, wherein the failure diagnosis section is disposed in a device connected to the image forming apparatus through a communication line.

3. The failure diagnosis apparatus according to claim 1, wherein:

the failure diagnosis section comprises a reception section that receives the operation state signals; and the operation state signals are automatically acquired by a sensor member disposed in the image forming apparatus during the image forming apparatus operating in different operation conditions, respectively.

4. The failure diagnosis apparatus according to claim 1, further comprising:

a notification section that notifies a result of the failure diagnosis by the failure diagnosis section to a user, wherein:

the failure diagnosis section sets one of the different operation conditions in accordance with a user's operation responsive to a notification of the result of the failure diagnosis through the notification section.

5. The failure diagnosis apparatus according to claim 1, wherein the failure diagnosis section analyzes, on a basis of the model, environment information that is automatically acquired in the image forming apparatus and relates to an operation of a driving mechanism, to perform the failure diagnosis.

6. The failure diagnosis apparatus according to claim 1, wherein the failure diagnosis section analyzes, on a basis of the model, history information of the operation state signals in the image forming apparatus, the history information managed in the image forming apparatus.

7. An image forming apparatus for forming an image on a predetermined output medium, the image forming apparatus comprising:

a conveyance section that conveys the output medium with using a predetermined driving mechanism;

an image forming section that forms the image on the output medium, which is conveyed to a predetermined position by the conveyance section;

an acquisition section that acquires operation state signals, which indicate respectively operation states of each part of the image forming apparatus during the driving mechanism operating in different operation conditions;

an image inspection section that compares a captured image, which is obtained by optically reading the image formed by the image forming section, with a reference image for inspection to analyze a state of defect in the captured image;

a failure diagnosis section that analyzes the operation state signals acquired by the acquisition section based on the state of the defect analyzed by the image inspection section and on a failure probability model, wherein the failure probability model is obtained by modeling a cause of the failure occurring in the image forming apparatus with using probabilities, to execute failure diagnosis with respect to each of constituent members constituting the image forming apparatus.

8. The image forming apparatus according to claim 7, further comprising:

an environment information acquisition section that acquires environment information relating to an operation of the driving mechanism with using a sensor member, wherein:

the failure diagnosis section analyzes, on a basis of the model, the environment information that is acquired by the environment information acquisition section, to perform the failure diagnosis.

9. The image forming apparatus according to claim 8, wherein the environment information acquisition section acquires at least one of peripheral temperature and peripheral humidity of a constituent member included in the driving mechanism as the environment information.

10. The image forming apparatus according to claim 7, further comprising:

an image reading section that optically reads the image formed by the image forming section, wherein:

the image inspection section compares the captured image read by the image reading section with the reference image for inspection to analyze the state of the defect in the captured image.

11. The image forming apparatus according to claim 7, further comprising:

a history storage section that stores history information of the operation state signals, wherein:

the failure diagnosis section analyzes, on a basis of the model, the history information stored in the history storage section.

12. A failure diagnosis method for diagnosing failure occurring in an image forming apparatus, the failure causing defect in an image output from the image forming apparatus, the method comprising:

acquiring operation state signals indicating operation states during the image forming apparatus operating in different operation conditions, respectively;

comparing, via an image inspection section, a captured image, which is obtained by optically reading the image output from the image forming apparatus, with a reference image for inspection to analyze a state of defect in the captured image;

analyzing the acquired operation state signals based on the state of the defect analyzed by the image inspection section and on a failure probability model, wherein the failure probability model is obtained by modeling a cause of the failure occurring in the image forming apparatus with the use of probabilities, to execute failure diagnosis with respect to each of constituent members constituting the image forming apparatus; and outputting the failure diagnosis results.

13. The method according to claim 12, wherein:

the acquiring of the operation signals comprises:

(a) automatically acquiring with using a sensor member a first operation state signal indicating an operation state during the image forming apparatus operating in a first operation condition; and (b) automatically acquiring with the sensor member a second operation state signal indicating an operation state during the image forming apparatus operating in a second operation condition being different from the first operation condition; and the analyzing of the acquired operation state signals comprises analyzing the first operation state signal and the second operation signal, which are acquired automatically, based on the failure probability model to execute the failure diagnosis with respect to each of the constituent members constituting the image forming apparatus.

14. The method according to claim 13, wherein the operation of the image forming apparatus in the second operation condition follows a user's operation.

15. A storage medium readable by a computer, the storage medium storing a program of instructions executed by the computer to perform a function for diagnosing a failure occurring in an image forming apparatus, the failure causing defect in an image output from the image forming apparatus, the function comprising:

acquiring operation state signals indicating operation states during the image forming apparatus operating in different operation conditions, respectively;

comparing a captured image, which is obtained by optically reading the image output from the image forming apparatus, with a reference image for inspection to analyze a state of defect in the captured image;

analyzing the acquired operation state signals based on the state of the defect analyzed by the image inspection section and on a failure probability model, wherein the failure probability model is obtained by modeling a cause of the failure occurring in the image forming apparatus with using probabilities, to execute failure diagnosis with respect to each of constituent members constituting the image forming apparatus.

* * * * *